US012269927B2

(12) United States Patent
Graham et al.

(10) Patent No.: US 12,269,927 B2
(45) Date of Patent: Apr. 8, 2025

(54) SYSTEM AND METHOD OF EXTRUDING A HEMP COMPOSITE BOARD USING HEMP FEEDSTOCKS

(71) Applicants: John D. Graham, Portland, OR (US); John J. Bradley, Harlingen, TX (US)

(72) Inventors: John D. Graham, Portland, OR (US); John J. Bradley, Harlingen, TX (US)

( * ) Notice: Subject to any disclaimer, the term of this patent is extended or adjusted under 35 U.S.C. 154(b) by 0 days.

(21) Appl. No.: 18/278,434

(22) PCT Filed: May 26, 2023

(86) PCT No.: PCT/US2023/023771
§ 371 (c)(1),
(2) Date: Aug. 23, 2023

(87) PCT Pub. No.: WO2024/049520
PCT Pub. Date: Mar. 7, 2024

(65) Prior Publication Data
US 2024/0084093 A1    Mar. 14, 2024

Related U.S. Application Data

(60) Provisional application No. 63/440,352, filed on Jan. 20, 2023, provisional application No. 63/403,450, filed on Sep. 2, 2022.

(51) Int. Cl.
C08J 9/04 (2006.01)
C08J 9/236 (2006.01)
C08J 11/06 (2006.01)

(52) U.S. Cl.
CPC ............... *C08J 11/06* (2013.01); *C08J 9/04* (2013.01); *C08J 9/236* (2013.01); *C08J 2201/03* (2013.01);
(Continued)

(58) Field of Classification Search
CPC .. B29C 48/0011; B29C 48/0019; C08J 11/06; C08J 9/04; C08J 9/236; C08J 2300/30;
(Continued)

(56) References Cited

U.S. PATENT DOCUMENTS 3,193,601 A    7/1965   Billingsley
3,904,338 A *  9/1975   Straumanis .............. G05D 5/03
                                                            264/40.7
(Continued)

OTHER PUBLICATIONS

Schirp, A.; Stender, J. Properties of extruded wood-plastic composites based on refiner wood fibres (TMP fibres) and hemp fibres. Eur. J. Wood Prod. (2010) 68:219-231 (Year: 2010).*
(Continued)

*Primary Examiner* — Christina H. W. Rosebach
(74) *Attorney, Agent, or Firm* — AdamsIP, LLC; Edward Brinkley Garner, III; James Hunter Adams

(57) ABSTRACT

A method for producing environmentally friendly, mono-extruded hemp composite board (EHB) is provided. By using hemp fiber and hemp hurd in combination with virgin and/or recycled binders, the system and method may be used to create preferable substitutes for traditional construction boards. The method generally comprises steps of processing hemp hurd/fiber and injecting said hemp hurd/fiber into an extruder along with a binder. Waste products from other production streams may be added as well to reduce waste/cost of said production streams. The resulting EHB is structurally superior to traditional construction boards largely due to the structural characteristics of dispersed hemp hurd and hemp fiber, their complete encapsulation in a binder material, and their lower hygroscopic properties. Additionally, since the EHB is created using an extruder, a downstream extrusion arrangement may be used to mold the EHB into shapes that are difficult to achieve with traditional construction boards.

7 Claims, 12 Drawing Sheets

(52) U.S. Cl.
CPC ...... *C08J 2201/032* (2013.01); *C08J 2300/30* (2013.01)

(58) Field of Classification Search
CPC ... C08J 2201/03; C08J 2201/032; C08L 97/02
See application file for complete search history.

(56) References Cited

U.S. PATENT DOCUMENTS

| | | | |
|---|---|---|---|
| 2006/0049541 A1* | 3/2006 | Sutton | C08J 3/201 264/320 |
| 2015/0218049 A1 | 8/2015 | Andersen et al. | |
| 2017/0121473 A1 | 5/2017 | Lu et al. | |
| 2018/0311915 A1 | 11/2018 | Mukherji | |
| 2023/0160141 A1* | 5/2023 | Hu | C08J 5/248 106/805 |
| 2023/0250244 A1* | 8/2023 | Killingsworth | B29B 9/14 524/13 |

OTHER PUBLICATIONS

Mcafee, M.; Thompson, S; McNally, G.M . . . In-process viscosity monitoring for extrusion control. Antec 2004 Plastics: vol. 1: Processing.Society of Plastics Engineers (SPE). Retrieved from https://app.knovel.com/hotlink/toc/id:kpANTECPM7/antec-2004-plastics-annual-2/antec-2004-plastics-annual-2 (Year: 2004).*

Giles, Harold F. Jr. Wagner, John R. Jr. Mount, Eldridge, M. III. (2005). Chp. 45 in Extrusion—The Definitive Processing Guide and Handbook. William Andrew Publishing/Plastics Design Library. Retrieved from https://app.knovel.com/hotlink/toc/id:kpETDPGH02/extrusion-definitive/extrusion-definitive (Year: 2005).*

Akonda, M.H.; Shah, D.U.; Gong, R.H. Natural fibre thermoplastic tapes to enhance reinforcing effects in composite structures. Composites Part A 131 (2020) 105822. (Year: 2020).*

Deborde, L. et al. Characterization of hemp fiber fire reaction. J Vinyl Addit Technol. 2023;29:259-267. (Year: 2023).*

Tres, Paul A . . . (2021). Designing Plastic Parts for Assembly (9th Edition). Hanser Publishers. Retrieved from https://app.knovel.com/hotlink/toc/id:kpDPPAE012/designing-plastic-parts/designing-plastic-parts (Year: 2021).*

Low, It-Meng Dong, Yu. (2021). Composite Materials—Manufacturing, Properties, and Applications. Elsevier. Retrieved from https://app.knovel.com/hotlink/toc/id:kpCMMPA002/composite-materials-manufacturing/composite-materials-manufacturing (Year: 2021).*

Kutz, Myer. (2015). Mechanical Engineers' Handbook, vol. 1—Materials and Engineering Mechanics (4th Edition). John Wiley & Sons. Retrieved from https://app.knovel.com/hotlink/toc/id:kpMEHVMEM5/mechanical-engineers/mechanical-engineers (Year: 2021 ).*

* cited by examiner

Fiber and Binder / View From Transverse Direction

Hurd and Binder / View From Transverse Direction

Fiber, Hurd and Binder / View From Transverse Direction

Fiber / View From Top of Board Fibers Will Orient
In The Machine Direction, But
Overlap Creating Strength

SYSTEM AND METHOD OF EXTRUDING A HEMP COMPOSITE BOARD USING HEMP FEEDSTOCKS

CROSS-REFERENCE TO RELATED APPLICATIONS

This application claims the benefit of U.S. Provisional Application Ser. No. 63/403,450, filed on Sep. 2, 2022, and U.S. Provisional Application Ser. No. 63/440,352, filed on Jan. 20, 2023, and International Application Serial No. PCT/US23/23771, filed on May 26, 2023, which are incorporated herein in their entirety by reference.

FIELD OF THE DISCLOSURE

The subject matter of the present disclosure refers generally to an extrusion process for creating a composite board using hemp feedstocks.

BACKGROUND

The three dominant construction boards used in building construction and remodeling have been primary building ingredients for decades. Plywood began to be used in the United States as a general building material in the 1920' and 30's for prefabricated houses focused on quick fabrication and easy disassembly and low cost. Drywall was invented in 1916. It was originally marketed as a wallboard to protect homes from urban fires, and as the poor man's alternative to plaster walls. Oriented Strand Board (OSB) was originally called waferboard and was created in the 1960's as a cheaper alternative to plywood.

Today, these three common construction boards in their various forms cover most interior and exterior walls, ceilings, roofs, and floors throughout the United States. Though each of the three boards can provide many benefits as building materials, each board has similar inherent drawbacks. The production of plywood and OSB are waste-intensive processes, emitting large amounts of wood wastes, water wastes, resin and wax wastes, and volatile emissions. Drywall production also has a noticeable environmental impact. Processing the gypsum releases particulates from the gypsum powder in addition to sulfur dioxide, nitrous oxide, and carbon monoxide. Heating the gypsum throughout the production process also has a high energy cost.

Each of these construction boards can degrade over their service life due to the inherent problems that exist in their material composition, process of manufacture, and product application. In particular, the hygroscopic properties of the wood pieces that comprise both plywood and OSB and the porous nature of gypsum used as the base material for drywall can make them a poor construction material choice in situations where they might be exposed to consistent patterns of moisture and humidity.

Hemp biomass is a renewable, recyclable, and compostable. Hemp plants are relatively easy to grow in most climates with a fast yield, typically reaching maturity in 85-100 days. Its capability to be grown almost anywhere creates maximum flexibility for site location and the ability to minimize the transportation footprint. Hemp returns 50% of the nutrients it takes from the soil and has the highest yield per acre of any natural fiber. Importantly, hemp base fiber is ten times stronger than wood fiber, is lighter and less expensive to produce.

Accordingly, there is a need in the art for a process that creates a superior quality construction board at a lower cost using sustainable ingredients to create a composite board that has improved mechanical and physical properties and addresses the shortcomings and inherent limitations of conventional construction boards.

SUMMARY

A method for producing a mono-extruded hemp composite board (EHB) using hemp feedstocks is provided. In one aspect, the method may be used to create EHB from hemp base fiber, hemp hurd (the cellulosic part of the hemp stalk), and binders that can be molded into different sizes and grades depending on the application. In another aspect, the method creates a hemp composite board that matches or exceeds the strength of conventional oriented strand board (OSB), is moisture resistant, easy to install, and sustainably sourced. In yet another aspect, the method may be used to create EHB using hemp feedstocks, a bio-based carbon and diverse waste streams that in combination can help reduce waste and enhance carbon capture. In yet another aspect, the component mix to create EHB can be altered easily to meet different market requirements. For those markets that require customization and enhanced performance, EHB will offer new applications that previously were not financially or technically feasible due to the inherent limitations of the OSB manufacturing processes. In yet another aspect, the method produces a replacement OSB product that can, using extrusion dies and post extrusion processing, create an "interlocking panel to panel mating surface" designed to prevent water intrusion common to OSB roof installations. Most OSB roof installations require a $\frac{1}{8}^{th}$ inch gap between the boards at the time of install because of the expectation of OSB board swelling and buckling. This $\frac{1}{8}^{th}$ inch gap creates a natural point of entrance for moisture penetration. Generally, the method of the present disclosure is designed to create a more environmentally sound replacement for existing OSB by combining hemp feedstocks with virgin and/or recycled thermoplastic or other binders.

The method for creating EHB from hemp feedstocks generally comprises the steps of farming, harvesting, retting, opening, grinding, separating, classifying, screening, filtering, mixing, extruding, curing, micronizing and post-curing processing. After harvesting, the hemp biomass typically undergoes a retting process in the field where it is grown. The retted (or unretted) hemp is baled and transported to a processing arrangement where it undergoes multiple processing steps that convert the hemp biomass into two distinct feedstocks, the hemp base fiber and the hemp hurd. In some embodiments, the separation arrangement may be configured to separate the components into distinct product streams. In other arrangements, the components may be separated and then recombined to create a distinct feedstock with a distinct mix, preferred range or variation of sizes/lengths in order to achieve certain properties in the final application. One skilled in the art will understand that natural materials have an inherent degree of variability, therefore the management of these feedstocks will always have a varied "range" of sizes and diameters that refinement can never completely homogenize as their very nature prohibits it.

Opening and loosening the hemp biomass begins the production process. A decortication process may follow that begins the separation of the hemp base fiber from the hemp hurd. In some cases, the hemp biomass can be processed without segregation via a series of grinding and screening processes. In a preferred embodiment, the processing arrangement comprises but is not limited to an opener, decorticator, and a series of mechanical screeners, high-speed air separators and pulverizing mills. The combination of the various machines used in the processing arrangement allows for classification of hemp base fibers and hemp hurd based on their length, diameter, and size to meet the ingredient requirements of manufacturing EHB.

To begin manufacturing EHB, a combination of the hemp base fiber and hurd feedstocks are injected into the upstream extrusion arrangement in combination with a binder feedstock. In some embodiments, the hemp feedstocks may be pre-compounded with a binder, or partially compounded with a binder, pelletized for inclusion, or any other commonly accepted means of feeding extruders used in polymer production to create the extrudate that is ultimately used to create a finished EHB product. These feedstocks are accepted by the extruder via a throat at the common entry point of most extrusion processes, or front end of the extruder and an extrudate is ejected at a back end of the extruder. In some embodiments, the feedstocks are dried prior to injection into the extruder to reduce downstream issues resulting from inconsistent moisture content of materials that can be hydroscopic at ambient temperature. In embodiments comprising single screw extruders, the feedstocks are preferably mixed. However, a twin screw extruder may be used to combine the components without departing from the inventive subject matter described herein. In some embodiments the hemp feedstocks and other feedstocks may be incorporated just before the extrusion die.

The resulting two hemp feedstocks are injected into the upstream extrusion arrangement in combination with a thermoplastic/thermoset, any/other polymer binder, natural binder/glue or non-natural binder/glue. In some embodiments, the hemp feedstocks may be pre-compounded with a thermoplastic/polymer binder, or partially compounded with a thermoplastic or any other polymer binder (ex. Lignosulfonates). They can also be pelletized for inclusion by means of a binder or pressure, or any other commonly accepted means of feeding extruders used in thermoplastic/thermoset/polymer, or other types of commercially available or custom extrusion production equipment to create the extrudate that is ultimately used to create a finished EHB product. These feedstocks are accepted by the extruder via a throat at the common entry point of most extrusion processes, or front end of the extruder and an extrudate is ejected at a back end of the extruder. In some embodiments, the feedstocks are dried prior to injection into the extruder to reduce downstream issues resulting from inconsistent moisture content of materials which can be hydroscopic at ambient temperature. In embodiments comprising single screw extruders, the feedstocks are preferably mixed. However, a twin screw extruder may be used to combine the components without departing from the inventive subject matter described herein. In some embodiments the hemp feedstocks and other feedstocks may be incorporated just before the extrusion die.

Where a non-heated type of extrusion is sufficient, the materials may be premixed in a dry format (partial or all raw materials) and then introduced into an extruder that creates adequate shear using a single or multiple screw-type mixing machine, or any other means of shear that creates sufficient mixing of the materials to be extruded. In embodiments comprising single screw extruders, the feedstocks are preferably mixed prior to being fed to said single screw extruders. In embodiments where the feedstocks are not premixed, a twin screw extruder is preferably used due to greater shear created within the barrel as well as greater distributive mixing and dispersive mixing created by the action of the twin screws within the barrel. However, both single screw extruders and twin-screw extruders may be used with mixed feedstocks or unmixed feedstocks without departing from the inventive subject matter described herein.

In some embodiments, the feedstocks injected into the extruder may be both individual feedstocks and a mixture of feedstocks that have undergone mixing, blending, or pre-compounding through a similar process as previously described. The viscosity (beyond that of the binder utilized) of the combined feedstocks (extrudate) within the extruder may be controlled via the amount of heat applied to the barrel/die as well as the amount of shear force applied by the extruder screw(s) as it rotates within the heated barrel. The amount of the feedstocks that make up the extrudate can also be reduced in size to reduce viscosity, increase material flow, and increase certain properties of the finished product as necessary.

Chemical agents or additives may be added to increase the "slip" of the material to reduce friction, increase flame retardancy or fire rating, increase the UV resistance, increase the mold or mildew resistance, reduce the static charge, or change the color of the finished product with the addition of pigments or other materials available. In some formulations, the introduction of bio-based carbon may be used to color the product as well as to improve the physical performance, UV resistance, improve the dispersion of the raw materials in the finished product, and to increase the surface to volume ratio of the integrated carbon. Anti-static agents may be incorporated based on the feedstock/binder selection. In some preferred embodiments, a blowing agent may be combined with the hemp feedstocks and thermoplastic/thermoset, or any polymer or other available binder to create a foamed extrudate. The temperature of the barrel is preferably cooled to ensure that the blowing agent does not become too hot and degrade prior to dissolving into the melted polymer binders within the barrel of the extruder. Further, non-vented extruders are preferably used for any foamed extrudates to prevent expansion of the gasses dissolved within the foamed extrudates prior to injection into the manifold.

As the extrudate is ejected from a manifold of the upstream extrusion arrangement in the form of an extrudate sheet, a plurality of rollers in a downstream extrusion arrangement may be used to pull the extrudate from the upstream extrusion arrangement so that said extrudate sheet may undergo the curing and post-curing processing steps. Minute adjustments in the speed of the plurality of rollers, especially during the curing process, enable fine adjustment of dimensional characteristics and features (e.g., wall thickness, internal diameter) of the extrudate sheet. In some embodiments, at least one roller of said plurality of rollers may be configured to imprint a pattern on the extrudate sheet. As the extrudate sheet is pulled through post-extrusion processing by the plurality of rollers, cooling equipment may be used to assist with the cooling of the extrudate sheet to increase consistency of the finished EHB product, as illustrated in FIG. 5. Cooling equipment used by the system may include, but is not limited to, immersion cooling tanks, vacuum cooling tanks, cooled rollers, and spray cooling tanks.

During the post curing processing step, the extrudate sheet may be further formed via machinery, depending on consistency and desired shape of the finished EHB product. Forming of the extrudate sheet is preferably accomplished using mechanical means, including, but not limited to pressure rollers, cutters, sanders, planers, and routers. In a preferred embodiment, a plurality of rollers will reduce the final board thickness to its final width during the curing process; however, a sander, saw, and/or router may be used after the thermoplastic/thermoset, other polymer, or natural binder/glue has set/cured the extrudate sheet to create the desired shape. After the extrudate sheet has been shaped, it may be, including but not limited to, treated, edge-coated, painted, printed, etched, or any combination thereof until the desired finished EHB product is acquired. Suction cups may be used to stack the finished EHB product for distribution.

Due to the use of recycled materials and sustainable hemp feedstocks, the various finished EHB products created using the methods described herein will result in a tremendous benefit to the environment when evaluated through a life cycle analysis (LCA). Finished EHB products under LCA will show that by using sustainable hemp feedstocks, reclaimed "waste" materials from construction and manufacturing processes, reduced shipping weights, and streamlined processing will dramatically offset the carbon offenses in the construction industry, and provide permanent carbon sequestration opportunities that currently do not exist today in available solutions. Additionally, the methods described herein include the possibility of including carbonized materials into the final product by using it as a feedstock, allowing for high carbon sequestration crops, such as hemp and/or bamboo, to be grown and turned into bio-carbon via pyrolysis before incorporation into the process described herein as a feedstock and carbon sink. This is possible because of the unique way that finished EHB products are produced using the method described herein. As such, when compared with the traditional methods or production for traditional construction materials, the LCA will show that the finished EHB products produced by the methods described herein are not only superior in terms of carbon capture but are also more sustainable.

The foregoing summary has outlined some features of the system and method of the present disclosure so that those skilled in the pertinent art may better understand the detailed description that follows. Additional features that form the subject of the claims will be described hereafter. Those skilled in the pertinent art should appreciate that they can readily utilize these features for designing or modifying other methods for carrying out the same purpose of the methods disclosed herein. Those skilled in the pertinent art should also realize that such equivalent modifications do not depart from the scope of the methods of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

Figure 1:
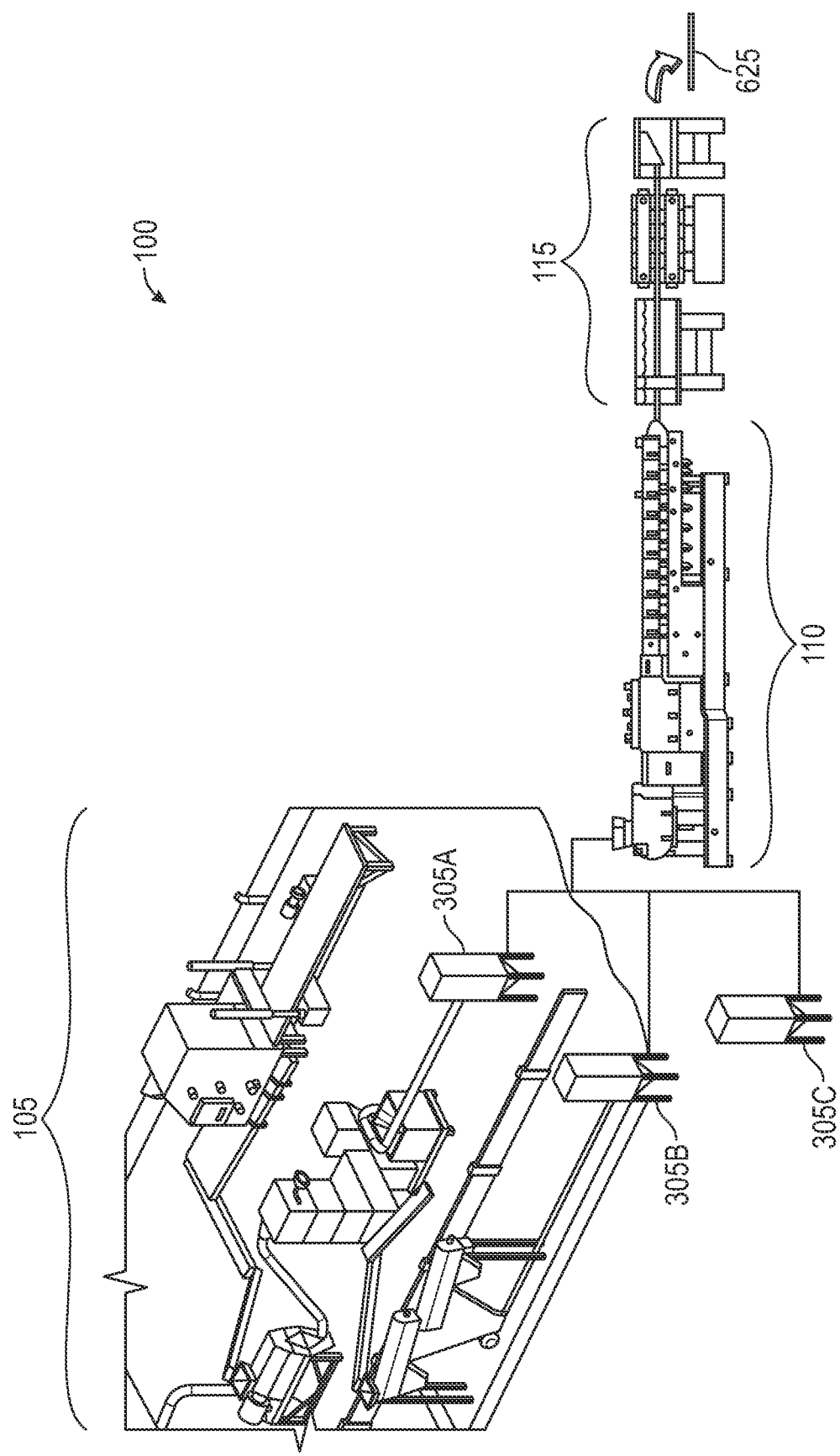
FIG. 1 illustrates a system configured to produce EHB and embodying features consistent with the principles of the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. The term "hemp feedstocks" and grammatical equivalents thereof are used herein to mean the hemp hurd and hemp base fiber obtained from hemp plants via processing. For example, a hemp-based composite may comprise a feedstock having hemp hurd, hemp base fiber, and a form of lignin, which may all be combined with a binder material to create the extrudate that forms the extrudate sheet. The term "distributive mixing" may be defined as the physical process of blending two feedstocks such that the physical separation distances are reduced to scale where diffusion can occur, leading to a more homogonous extrudate. The term "monoextrusion" and grammatical equivalents thereof are used herein to mean a single layer extrudate sheet formed from a single extrudate that has not been extruded on to a substrate. The term "dispersive mixing" may be defined as the breakup of the minor component of a mixture into smaller size particles. The term "blowing agent" and grammatical equivalents thereof are used herein to mean additives injected into extruders along with binder feedstocks to create foamed extrudates.

FIGS. 1-12 illustrate embodiments of a system 100 used to produce a finished mono-extruded hemp composite board (EHB) product 625 as well as a method for creating said finished EHB product 625. In a preferred embodiment, the feedstocks 305 used to make finished EHB product 625 comprise hemp biomass (broken down into its various components) and a binder material 305C. As illustrated in FIGS. 1-6 and 9-12, the process involves processing hemp biomass into hemp base fiber 305B and hemp hurd 305A before combining said hemp base fiber 305B and hemp hurd 305A with a binder material 305C via an extruder 310 to create an extrudate 320 that is subsequently molded and processed into a finished EHB product 625. A screw 310D contained within a barrel 310C of the extruder 310 mixes and heats said feedstocks 305 via shear force created by the action of the screw 310D within the barrel 310C, resulting in an extrudate 320 that is subsequently ejected through a die outlet of a manifold 325 secured to the extruder 310 to create an extrudate sheet 330. The extrudate sheet 330 is pulled from the extruder 310 via a plurality of rollers, wherein said extrudate sheet 330 is allowed to cool and undergo post extruding processing until a finished EHB product 625 is obtained.

Figure 2:
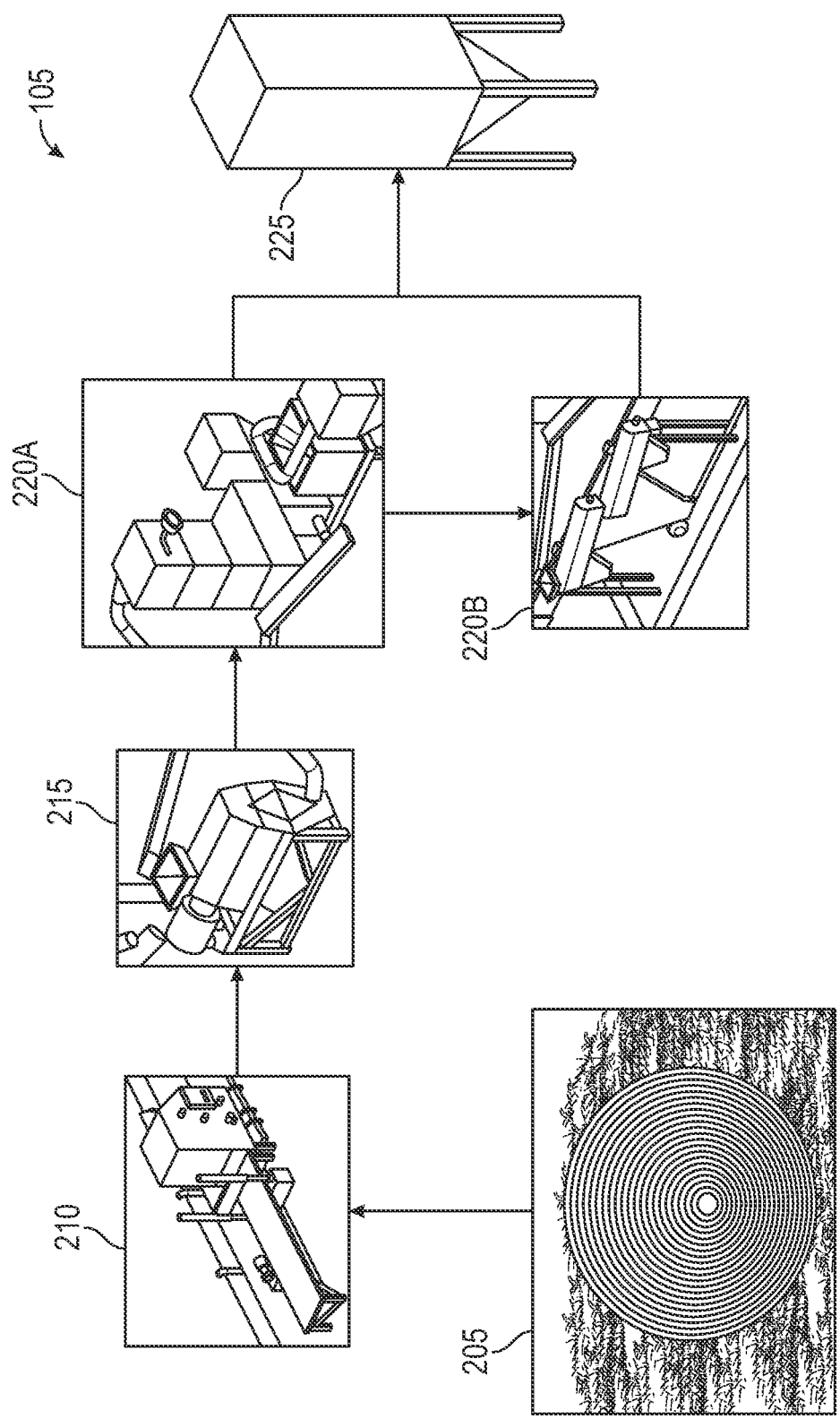
FIG. 2 illustrates a separation arrangement embodying features consistent with the principles of the present disclosure.
Figure 3:
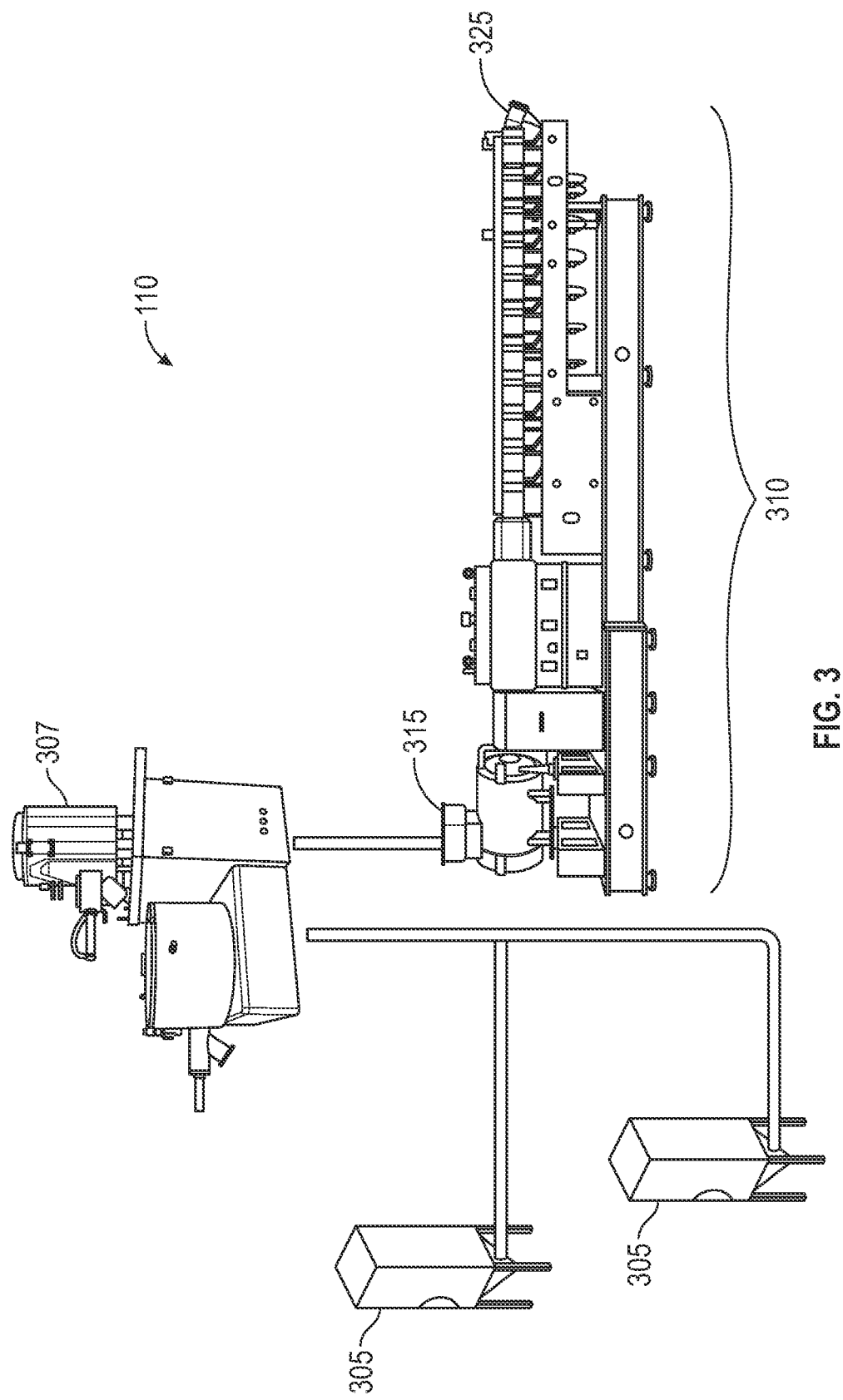
FIG. 3 illustrates an upstream extrusion arrangement embodying features consistent with the principles of the present disclosure.
Figure 4:
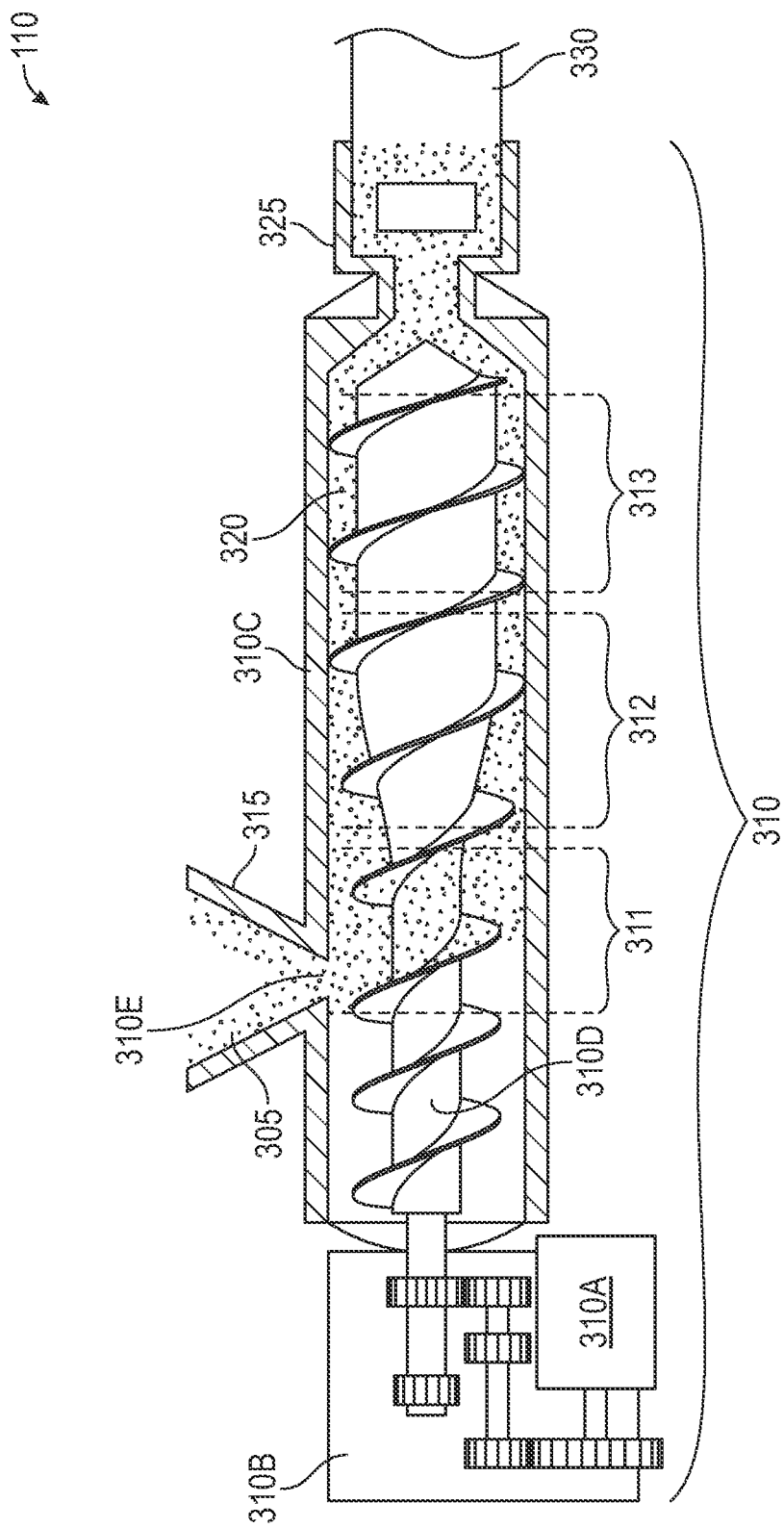
FIG. 4 illustrates a cross sectional view of an extruder embodying features consistent with the principles of the present disclosure.
Figure 5:
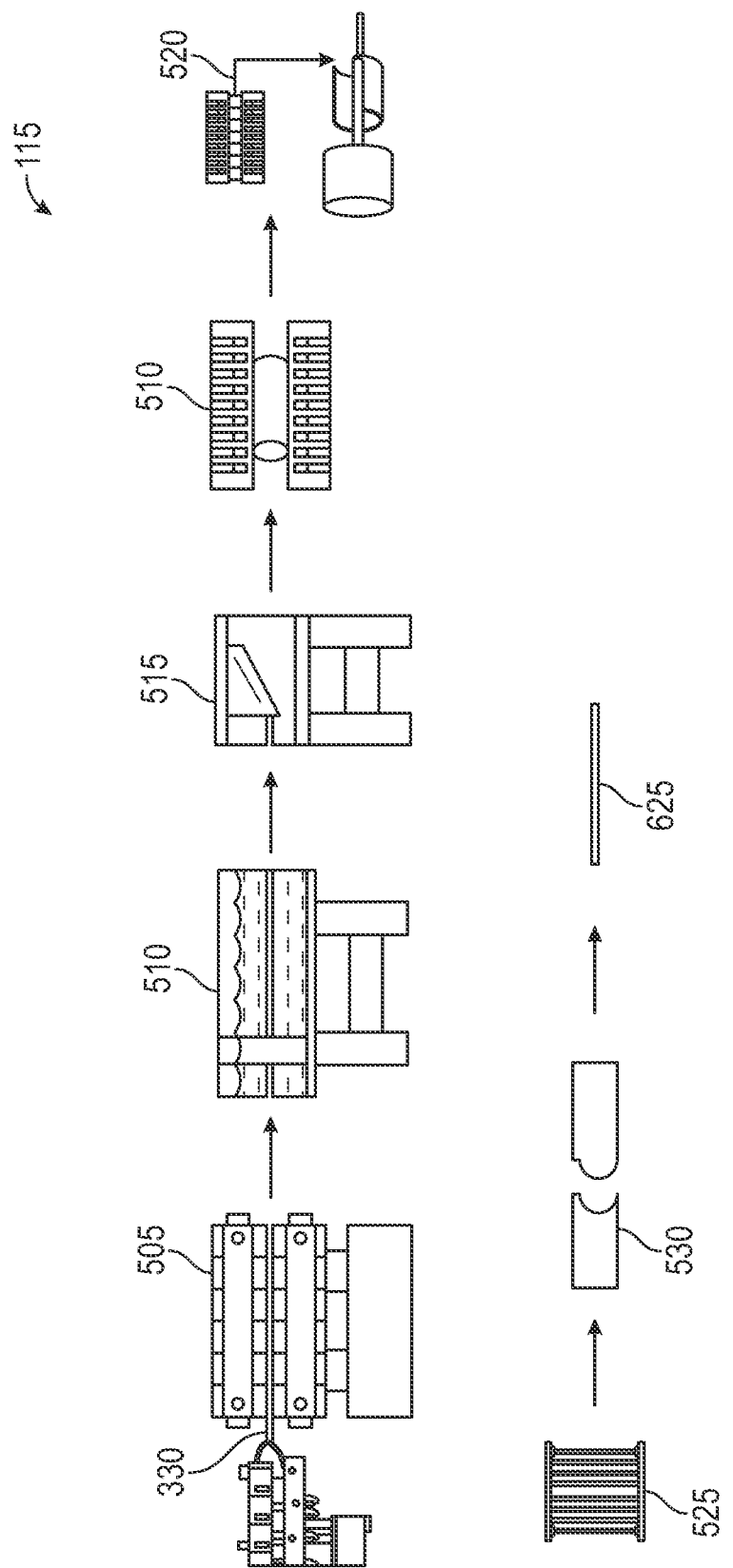
FIG. 5 illustrates a downstream extrusion arrangement embodying features consistent with the principles of the present disclosure.
Figure 6:
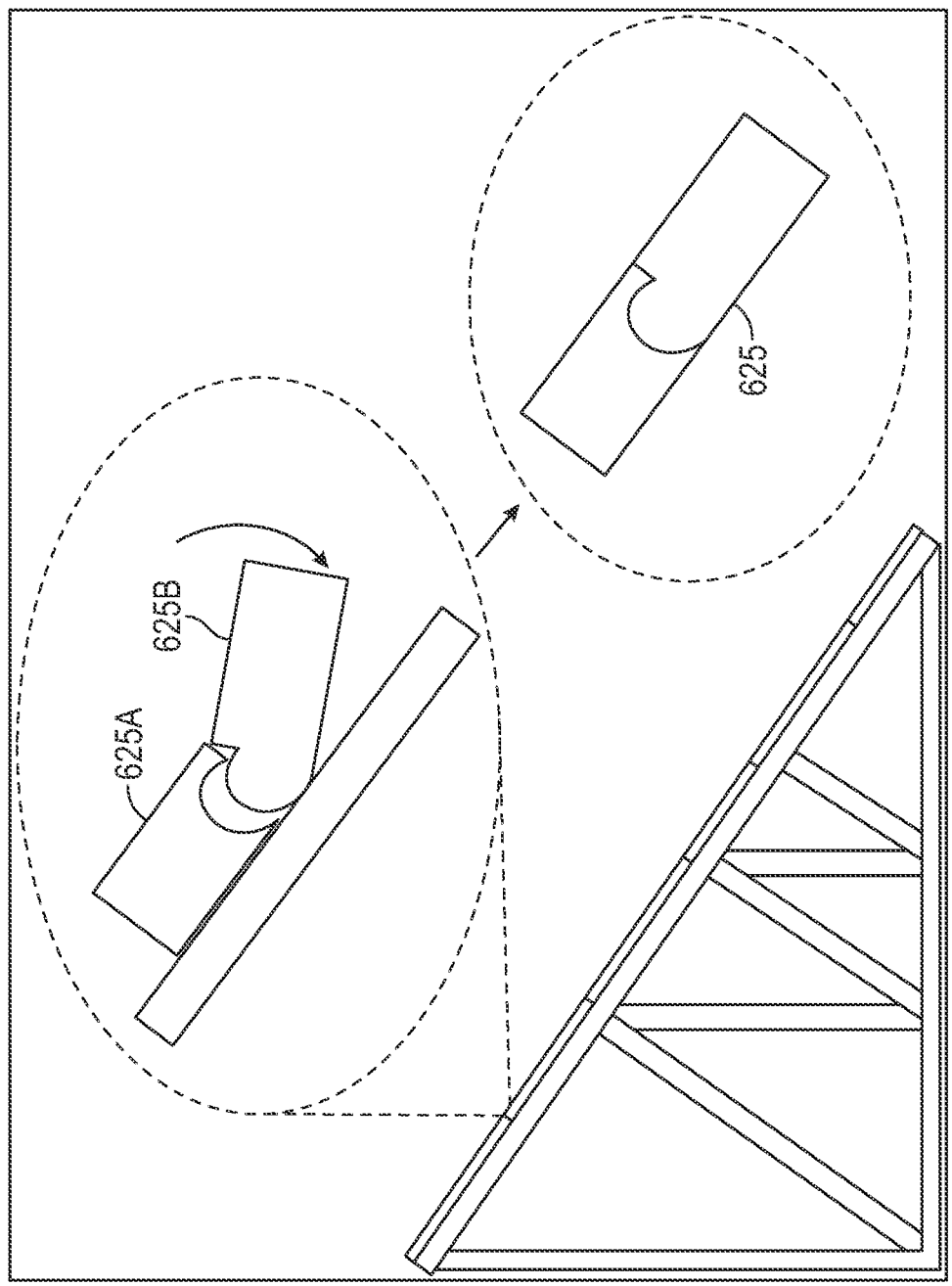
FIG. 6 illustrates a finished EHB product embodying features consistent with the principles of the present disclosure.
Figure 7A:
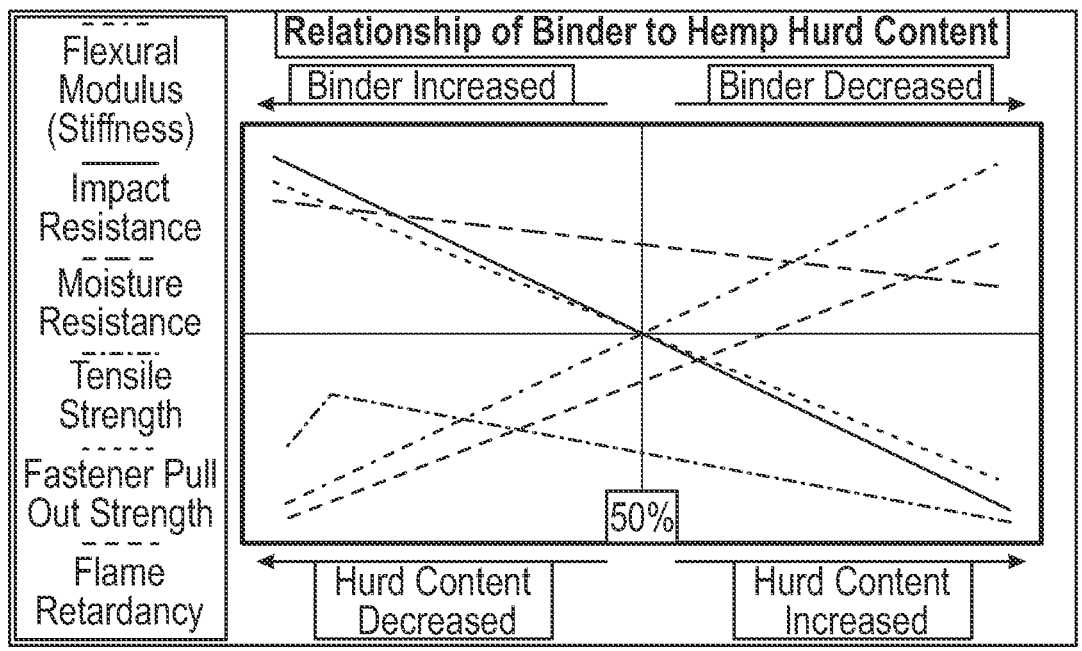
FIG. 7A is a chart illustrating physical properties of a finished EHB product as a function of the amount of hemp base fiber relative to the amount of binder material used to produce said finished EHB product.
Figure 7B:
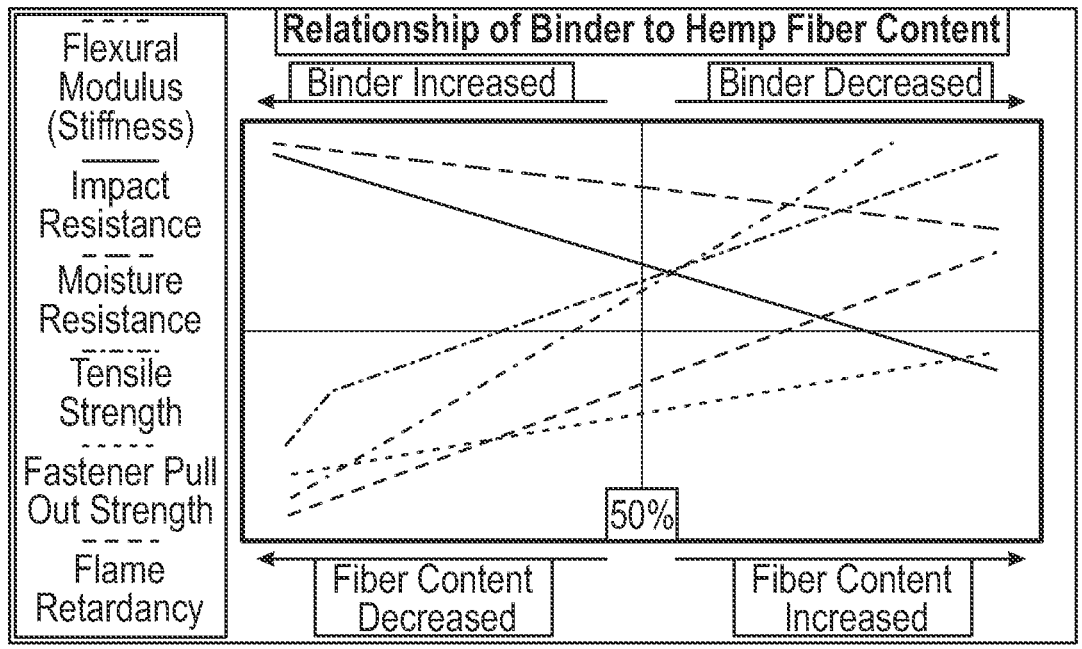
FIG. 7B is a chart illustrating physical properties of a finished EHB product as a function of the amount of hemp hurd relative to the amount of binder material used to produce said finished EHB product.
Figure 8:
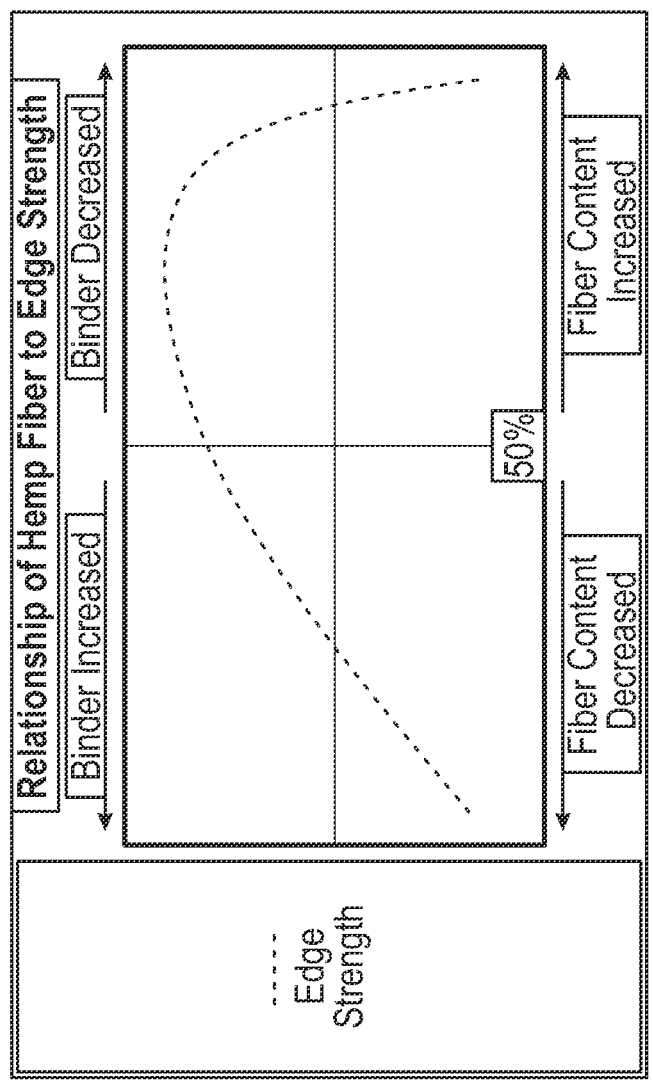
FIG. 8 is a chart illustrating edge strength of a finished EHB product as a function of the amount of hemp base fiber used to produce said finished EHB product.
Figure 9:
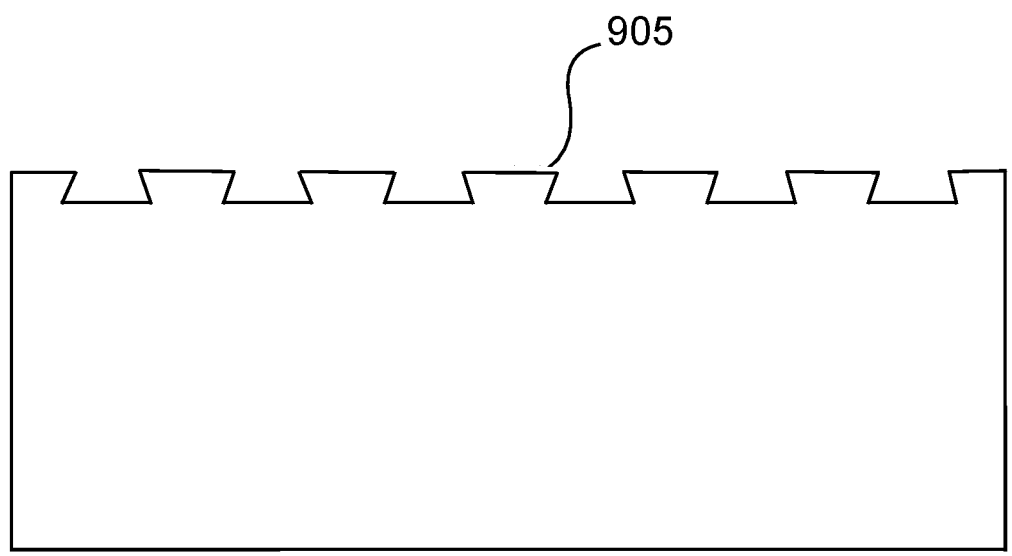
FIG. 9 illustrates a cross-sectional view of an extrudate sheet embodying features consistent with the principles of the present disclosure.
Figure 10:
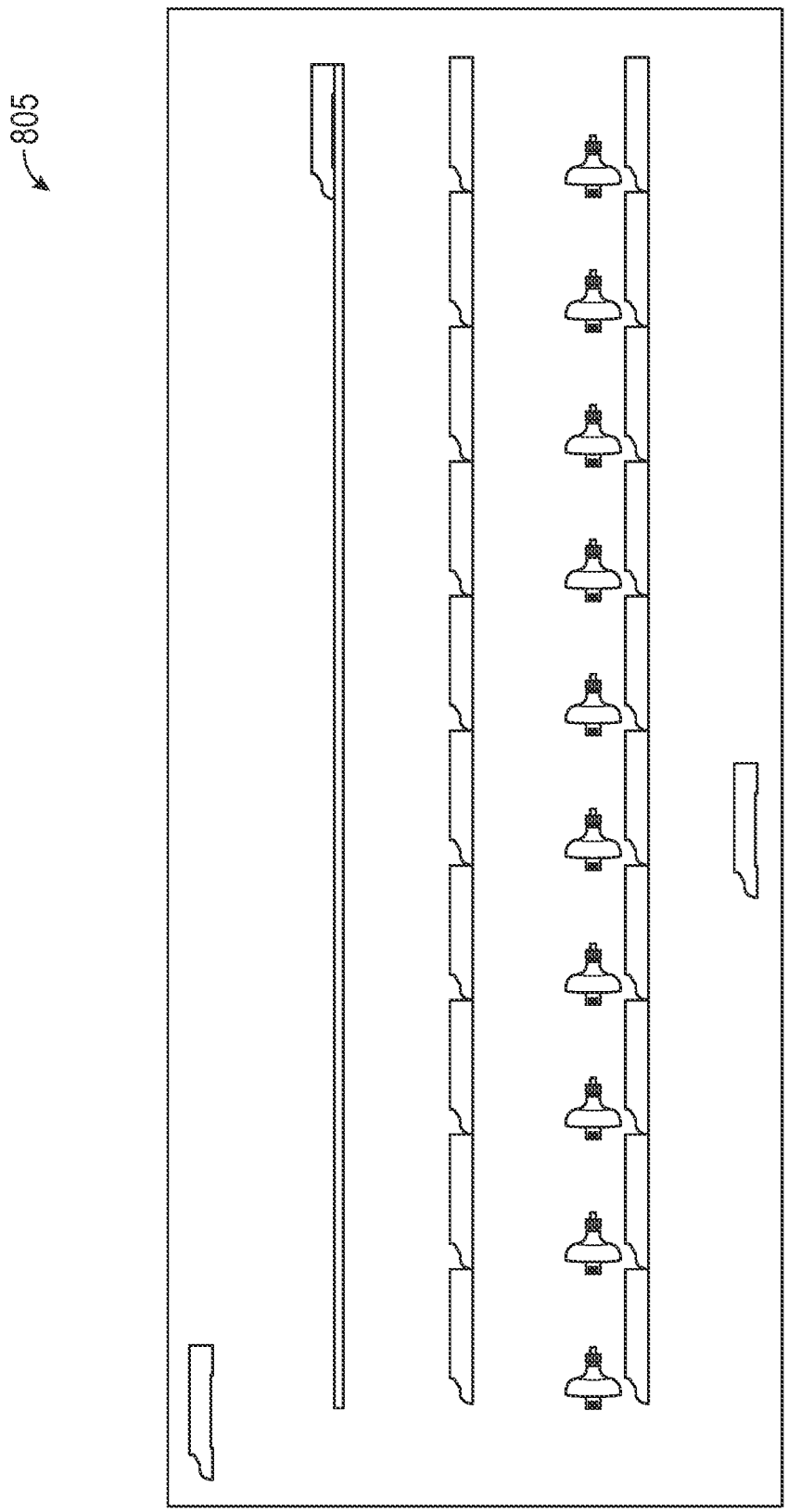
FIG. 10 illustrates an extrudate sheet comprising molded shapes and embodying features consistent with the principles of the present disclosure.
Figure 11:
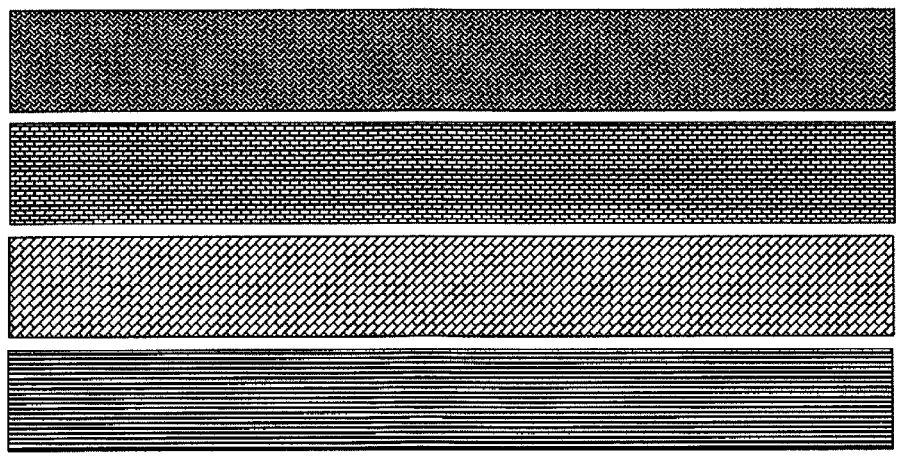
FIG. 11 illustrates a top view of an extrudate sheet comprising a pattern and embodying features consistent with the principles of the present disclosure.
Figure 12:
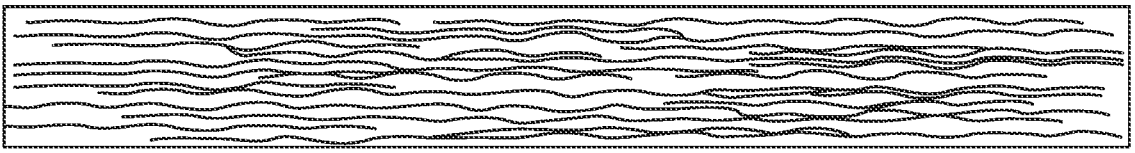
FIG. 12 illustrates the hemp base fiber alignment within the binder material and embodying features consistent with the principles of the present disclosure.
Figure 12:
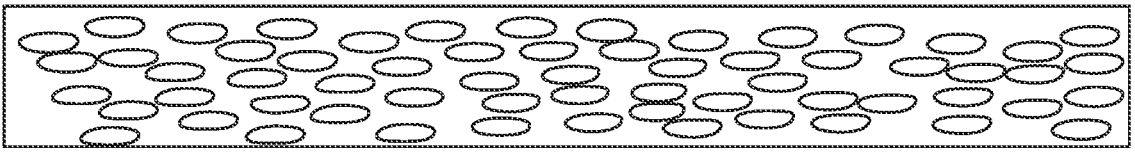
Figure 12:
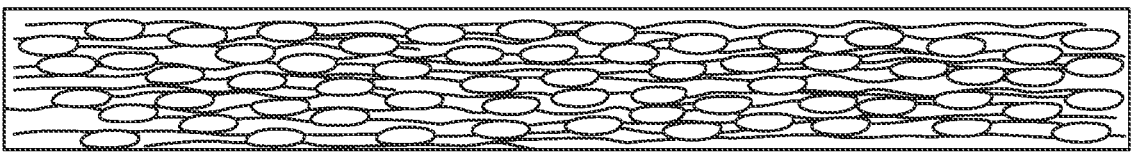
Figure 12:
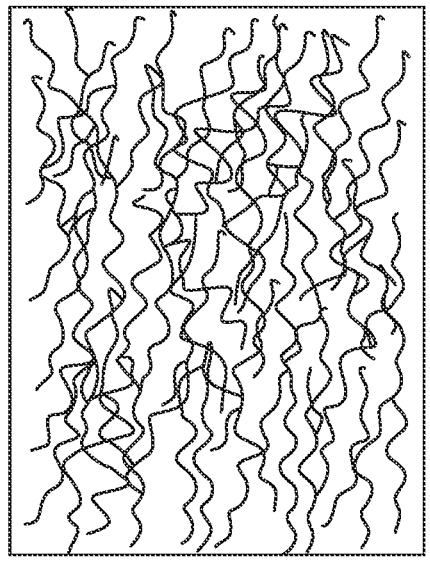

FIG. 1 is an exemplary diagram of a system 100 that may be used to produce finished EHB product 625, wherein said system 100 generally comprises a separation arrangement 105, upstream extrusion arrangement 110, and downstream extrusion arrangement 115. FIG. 2 is an exemplary diagram of the separation arrangement 105 of a system 100 used to produce finished EHB product 625. FIG. 3 is an exemplary diagram of the upstream extrusion arrangement 110 of a system 100 used to produce finished EHB product 625. FIG. 4 is a cross-sectional view of an extruder 310 being used to create extrudate 320 using feedstocks 305 fed to said extruder 310 via a throat 310E of said extruder 310. FIG. 5 is an exemplary diagram of the downstream extrusion arrangement 115 of a system 100 used to produce finished EHB product 625. FIG. 6 illustrates a finished EHB product 625 that may be used in construction. FIGS. 7A and 7B depict how physical properties of finished EHB product 625 may be altered by changing the amount of hemp feedstock used relative the amount of binder material. FIG. 8 depicts how edge strength of finished EHB product 625 may be altered by changing the amount of hemp base fibers 305B used to produce the extrudate 320. FIG. 9 depicts a cross-sectional view of an extrudate sheet comprising a plurality of micro-grooves. FIG. 10 illustrates an extrudate sheet comprising a plurality of molded shapes 805. FIG. 11 illustrates an extrudate sheet 630 before and after the application of a pattern 905. FIG. 12 illustrates the alignment of hemp feedstocks within the extrudate sheet 330 after ejection of the extrudate from the upstream extrusion arrangement 110. It is understood that the various method steps associated with the methods of the present disclosure may be carried out by a user using the system 100 illustrated in FIGS. 1-6 and 9-12.

Industrial hemp base fiber 305B is one of the strongest and stiffest available natural fibers and therefore has a great potential for use as a reinforcement in composite materials used for construction. Hemp base fiber 305B has a relatively low production cost and is more eco-friendly compared to other materials used in construction due to hemps natural ability to capture carbon as well as its inherent biodegradability. Additionally, hemp hurd 305A and hemp base fiber 305B have a lower bulk density than wood fiber but are still able to create strong bonds with the binder matrix of a binder material 305C comprising a polymer binder. As such, using hemp feedstocks to create construction materials results in said materials that exceed the physical and mechanical properties of wood-based construction materials. In addition, non-foamed finished EHB products 625 containing ~40% or more hemp feedstock by volume will be lighter than the traditional construction material equivalent. Foamed finished EHB products 625 can possess as little as 5% hemp feedstock and be lighter than its equivalent traditional construction material. For example, a 4'×8' sheet of a finished EHB product 625 optimized for wallboard and containing 50% hemp hurd by volume and 50% high density polyethylene by volume is approximately 10% lighter than a traditional OSB board of the same size. This could greatly reduce shipping costs of construction materials over long distances and reduce the burden of installation.

Because hemp biomass is a natural product and not synthetic, the cross-sectional shapes of hemp feedstocks can be expected to show variation, which is compensated for by utilizing the broad size distribution that results regardless of processing of the hemp feedstocks to create a more filled/distributed composite material to improve the physical/mechanical properties of a finished EHB product 625. Further, depending on the type of polymer binder used, there can be compatibility issues between the hydrophilic hemp base fiber 305B and hemp hurd 305A when using generally hydrophobic polymer binders and their resulting matrices. Therefore, in some embodiments, the hemp feedstocks may need physical and/or chemical treatments to enhance the resulting fiber-matrix interface of the composite material. Chemical treatment of the hemp feedstocks may be particularly useful when applied to reduce hydrophilicity. Alternatively, the hemp feedstocks can be encapsulated within a nonpolar binder material (such as polyethylene (PE), polypropylene (PP), and polystyrene (PS)) to enhance water resistance. In some cases, a coupling agent may need to be used to increase the strength of the hemp-binder matrix. Water absorption by hemp based composite materials can be significantly decreased by incorporating certain fillers and chemicals into the hemp-based composite without a decrease in strength.

When the water absorption properties of hemp feedstocks can be minimized, the benefits to mechanical and physical properties that hemp feedstocks can provide over other materials becomes more apparent. First, fiber loading can provide major benefits to mechanical properties of hemp-based composite materials. An increase in the tensile stress, tensile strength, impact strength, and flexural modulus of hemp-based composite occurs as fiber content increases. Second, the reactive hydroxyl groups of hemp base fibers 305B offer effective interaction between the fiber and binder material, allowing the hemp-based composite to absorb energy during any potential impact. For example, when using finished EHB product 625 as underlayment for a roof, the hemp-binder matrix created by the hemp biomass and a polymer binder used to encapsulate said hemp biomass creates a much more impact resistant material than does a construction/composite board made purely of the same polymer binder. This hemp-binder composite board could be particularly beneficial in regions that typically experience hailstorms.

Additionally, hemp hurd 305A and hemp base fiber 305B can be used at various percentages to enhance different physical properties and/or mechanical properties of the composite material as illustrated in FIGS. 7 and 8. In particular, the addition of hemp base fiber 305B and/or hemp hurd 305A to binder material 305C has the benefit of increasing edge strength, flexural modulus, tensile/pull strength, and screw pull strength (fastener retention). An increase in edge strength is particularly beneficial for construction materials since materials having higher edge strengths will experience less cracking during transport, installation and long-term use. For example, finished EHB product 625 created for use as a subfloor under carpet may comprise approximately 25% by volume micronized hemp feedstock, 10% by volume bio-derived carbon, and 65% by volume non-polar, virgin polymer binder with an amount of a required coupling agent to enhance bonding between the hemp feedstock and the non-polar, virgin polymer binder. This will result in a finished EHB product 625 subflooring material with strength at least as great as that of OSB but with superior water resistance, pest resistance, and rot resistance properties. In a preferred embodiment, hemp hurd 305A and hemp base fiber 305B loading is kept between 15% and 50% by volume to reduce discontinuity, non-homogeneity, and agglomeration of the hemp feedstocks during the extrusion process. However, as little as 5% by volume and as much as 95% by volume of hemp base fiber 305B and/or hemp hurd 305A may be used without departing from the inventive subject matter described herein.

Though hemp biomass has a broad range of applications for which it may be used, it is best when it is separated into its two constituents before it is incorporated into construction/composite materials. In some embodiments, this may be made easier by degrading or removing the pectin and lignin from the hemp base fiber after processing using a process called degumming. In some embodiments, this may be made easier by degrading or removing the pectin and lignin from the hemp base fiber after processing using a process called degumming. The removal of pectin and lignin may enhance the final properties of some EHB products; however, removal of pectin and lignin is not necessary to create a superior finished EHB product 625. Where a specific binder may not be compatible with the pectin and lignin in the hemp base fiber feedstock, those pectins and lignins can be removed to allow greater adhesion to the more cotton like fibers that are the result of degumming hemp base fiber.

Once the industrial hemp plant reaches a preferable maturity, the hemp stalks are harvested, baled 205, and transported to a processing site. In a preferred embodiment, as illustrated in FIGS. 1 and 2, the separation arrangement 105 comprises an opener 210, shredder 215, screener 220A, and air separator 220B configured to decompress, grind, segregate and mill said hemp biomass, respectively. In one preferred embodiment, hemp biomass is passed between fluted rollers that loosen the woody, cellulosic core from the hemp base fiber 305B. A series of screening and air separation processes may be used to further separate the remaining hemp hurd 305A and hemp base fiber 305B. In some preferred embodiments, a decorticator may be used to break apart hemp biomass into hemp hurd 305A and hemp base fiber 305B. When an application requires ratios of hemp hurd 305A to hemp base fiber 305B as they naturally occur, the only processes required are a series of grinding and screening steps, thereby eliminating all of the other separation processes. Further, in embodiments where only shorter hemp base fibers 305B are desirable, processing machinery may be used to convert all the longer fibers into shorter fibers. In some embodiments a blend of long and short fibers may be combined as a blend to create additional beneficial properties like flexural modulus and tensile strength. The transport of the modified hemp biomass throughout the separation, screening and milling processes is preferably done via suction, but other methods of material conveyance may include, but not limited to, conveyors, blowers, manual manipulation, or any combination thereof.

In one preferred embodiment, the clusters of hemp material are cleaned via a decortication machine which segregates the various lengths of hemp biomass material into hemp hurd 305A and hemp base fiber 305B using a series of paddles and combs. Once separated, the hemp hurd 305A and hemp base fiber 305B are further cleaned and sized using a series of mechanical screens and air separation equipment. The various steps required to produce clean hemp hurd 305A means removing all, or a majority of the hemp base fiber 305B that naturally clings to the hurd. Similarly, to produce clean fiber requires removing any hemp hurd 305A that is naturally bound and attached to the hemp base fiber 305B. Once the hemp hurd 305A and hemp base fiber 305B have each been processed to reach the desired level of product purity, a series of mills and screens are deployed to create the individual product sizing required to meet a market application.

Once the hemp has been processed into the desired components, these feedstocks 305 are transferred to an extrusion arrangement to create the extrudate 320 that will be used to make the finished EHB product 625. In a preferred embodiment, the hemp feedstocks are combined with a binder material 305C and sometimes other feedstocks 305 to create the finished EHB product 625. The binder material 305C may be a virgin binder material, post-consumer/industrial waste binder material, or a combination of the two. Types of materials that may act as the binder material include, but are not limited to, starch-based binders, polymers, polyester resin, epoxy resin, polyurethane resin, ISO resin, vinyl ester resin, and methyl ethyl ketone peroxide (MEKP). In a preferred embodiment, the binder material is at least one of a thermoplastic/thermoset, epoxy binder, and non-polymer, non-epoxy binder, or any combination thereof. For example, a thermoplastic may be combined with a low temperature epoxy (LTE) to create a binder material that may be both curable and/or polymerizable, depending on the desired finished EHB product 625. In some preferred embodiments, the epoxy may be a heat cured epoxy, which may be combined with a thermoplastic having a melt temperature similar in range to the curing temperature of the epoxy.

The hemp base fiber 305B and hemp hurd 305A are preferably combined with a polymer binder to create the extrudate 320. The polymer binder is preferably that of the thermoplastic resin material possessing the ability to encapsulate the hemp feedstocks that reduce water absorption of the finished EHB product 625. In a preferred embodiment, thermoplastics used as a feedstock to create the finished EHB product 625 include, but are not limited to polyethylene (PE), polypropylene (PP), polyethylene terephthalate (PET or PETE), polyamide (Nylon/PA), acrylonitrile butadiene styrene (ABS), acrylonitrile styrene acrylate (ASA), cellulose acetate (CA), polybutylene terephthalate (PBT), polycarbonates (PC), polymethyl methacrylate (PMMA), polyvinyl chloride (PVC), polyphenylene oxide (PPO), polystyrene (PS), styrene acrylonitrile (SAN), thermoplastic elastomer (TPE), thermoplastic urethane (TPU), or any combination thereof.

finished EHB product 625 created using the described method may also incorporate various waste streams to reduce cost, capture carbon, and increase environmental sustainability. In a preferred embodiment, waste streams that may be used as feedstock include, but are not limited to, wood fines, bio-carbon, gypsum, glass fibers, post-consumer polymers, post-industrial polymers or any other waste stream deemed appropriate. The use of post-consumer or post-industrial plastics may be particularly useful for applications in which slight reductions in physical and mechanical properties are acceptable compared to that of virgin plastics. For example, foamed finished EHB product 625 may be created using 20% by volume hemp feedstock, 10% by volume wood fines, 5% by volume recycled gypsum, 10% by volume recycled glass fibers, 5% by volume carbon from bio-natural sources, and 50% by volume binder derived from post-consumer or post-industrial reclaimed polymers/thermoplastics. When compared to other wood-based construction boards, the resulting EHB will be more durable than standard OSB of comparable thicknesses and have better acoustical, insulative and hygroscopic properties. In another preferred embodiment, the aforementioned mix and ratio may utilize a "foaming agent" to create a cellular structure in the finished EHB. Per a specification that would require, including, but not limited to, an increased amount of stiffness, a potentially a higher degree of insulative value, or potentially to reduce the final weight of the EHB based on certain specifications and intended application, a lighter board in the same dimensions is achieved with the addition of foaming agents.

The blends using hemp biomass combined with those waste streams can create a variety of composite boards that exceed the standard baseline requirements in a multitude of applications that currently use plywood, particle board, MDF, fiber board, block board, hard board, insulation board, and OSB. Where a market exists for these types of manufactured wood-based boards, there is little inherent flexibility in their manufacture, and almost no flexibility in their material composition due to their need to be mass produced using very capital-intensive processes. EHB has a significant advantage over OSB and other wood products because of its low-cost material composition and manufacturing processes. Importantly, the component mix of an EHB can be altered easily to meet different market requirements. As such, EHB can be a cost-effective alternative to current wood products in all construction applications and additionally for those markets that require customization in addition to enhanced performance.

In another preferred embodiment, feedstocks 305 in the form of additives may be added to the extruder 310 with the hemp feedstocks and binder material 305C to acquire a finished EHB product 625 having properties more suitable for a specific purpose. Types of additive feedstocks 305 that may be fed to the extruder 310 include, but are not limited to, flame retardants, blowing agents, anti-static agents, UV resistance agents, impact resistance agents, coloring agents/pigments, flexural modulus agents, insecticides, fungicides, tensile strength agents, coupling agents, or any combination thereof. The introduction of a filler, such as glass fibers, and/or chemicals, such as maleic anhydride and stearic acid, can help counteract any increased hydrophilicity of the treated/untreated hemp feedstocks. Fillers that may be used to create the finished EHB product 625 include, but are not limited to calcium carbonate, kaolin clay, magnesium hydroxide, glass fibers, nanofillers, or any combination thereof. Coupling agents, such as maleic anhydride grafted olefins, can be used to encourage bonding between non-compatible binder materials and hemp feedstocks. Additionally, hemp feedstocks can be carbonized to enhance sorption properties by increasing the specific surface area and surface oxygen groups of the hemp feedstocks.

Hemp base fibers 305B may also be treated with chemical treatments including, but not limited to, NaOH, polyethyleneimine, $Na_2SO_4$, and $Ca(OH)_2$ in order to change or enhance the structural characteristics of the hemp feedstocks. Chemically changing these structural features may modify certain undesirable properties, such as hydrophilicity, and improve flame retardancy of the resulting hemp-based composite. For example, modification of hemp feedstocks with phosphorus enhances the limiting oxygen index (LOI) of hemp-based composites, resulting in a decreased rate of heat release and an increase in resistance to combustion. Further treatment with phosphines can enhance flame retardancy as well. Treatment of hemp feedstocks with water-soluble sulfonic acid derivatives can reduce surface polarity (lowering water solubility) of the hemp feedstocks and improve their thermal stability. This will also result in a stronger hemp-binder matrix when combined with a polymer binder and improved flame resistance. The aforementioned methods of flame retardancy, and other commercially available flame retardants may be deployed to enhance fire retardancy based on the blend of materials used and their compatibility.

Though the feedstocks 305 may be added directly to the upstream extrusion arrangement 110 without mixing (due to the mixing that occurs within the extruder 310), some preferred embodiments of the system 100 may include a mixer 307, wherein the hemp feedstocks may be mixed and/or blended to create a finished mixed hemp feedstock at a specific ratio prior to transference to the extruder 310. The resulting mixed feedstock may possess desired dispersive and distributed properties that may increase consistency of the finished EHB product 625. Mixing may be defined as the intermingling of different classes of hemp hurd 305A or hemp base fiber 305B of the same length. Whereas blending may be defined as the intermingling of hemp hurd 305A and hemp base fiber 305B or the intermingling of different lengths of hemp hurd 305A and/or hemp base fiber 305B. Blending/mixing of hemp feedstocks may occur at various points within the separation arrangement 105 or just prior to the addition of the hemp feedstocks to the extruder 310 of the upstream extrusion arrangement 110. In some preferred embodiments, a blending/mixing machine may be used to combine hemp feedstocks coming from various sources or from different hemp genetic strains. Hemp plants from different genetic strains may have different percentages of hurd, fiber, and lignin as well as different fiber structures. By using a mixer 307 to mix hemp biomass from different sources, a more consistent finished EHB product 625 may result. The objectives of mixing/blending of different feedstocks include, but are not limited to, more consistent content quality, improved processing performance, more consistent functional properties of a finished EHB product 625, and a more uniform distribution of feedstock(s) within the binder material 305C prior to undergoing extrusion.

The use of a mixer 307 may be particularly important when the extruder 310 used has poor distributive mixing properties since a homogenous extrudate 320 may otherwise be impossible to achieve. In a preferred embodiment, the transfer of feedstocks 305 to the mixer 307 may be accomplished using a blower, but other methods of transfer may be used to transport feedstocks 305 to the mixer 307, including, but not limited to, conveyors, suction, and manual modes of conveyance. The blower may transport the feedstocks 305 using positive pressure air flow within a transport tube, reducing the chance of contaminants being introduced during transference. In a preferred embodiment, the mixing process entails measuring a required amount of different feedstocks 305 needed to create a desired extrudate 320 and mixing/blending the feedstocks 305 until a homogenous feedstock is achieved. The feedstocks 305 are preferably stored in storage bins that may be refilled as the feedstocks 305 are used. In a preferred embodiment, the feedstocks 305 combined within the mixer 307 are added to said mixer 307 based on a percentage of volume of each feedstock needed for a desired extrudate 320. A weighing hopper may be used to measure the amount of each feedstock(s) used to create the mixed feedstock.

In one preferred embodiment, the extrudate 320 may comprise a single hemp feedstock having a single desired length and/or diameter. For example, a desired length of hemp base fiber 305B of 15 millimeters may yield optimal results when combined with a particular binder material 305C whereas a length of 0.5 millimeters may yield optimal results with a different binder material 305C. In another preferred embodiment, the extrudate 320 may comprise a single hemp feedstock having multiple lengths and/or diameters with binder material 305C plus a hemp feedstock comprising a combination of hemp base fibers 305B having different desired lengths. In yet another preferred embodiment, the extrudate 320 may require different hemp feedstocks having one or more desired lengths. For example, the hemp extrudate 320 may comprise a combination of hemp hurd 305A, hemp base fiber 305B, and binder material 305C, wherein the hemp hurd 305A and hemp base fiber 305B comprise multiple desired lengths and/or diameters. These hemp feedstocks may be stored separately and added to the mixer 307 and/or extruder 310 so that fine tuning of the finished product may be accomplished by simply changing the amount of each feedstock that is added to the mixer 307 and/or extruder 310.

In a preferred embodiment, hemp hurd 305A comprises a particle size of 0.003-8 millimeters, and hemp base fiber 305B comprises a diameter range of 0.003-0.200 millimeters and a length range of 0.003-36 millimeters. However, hemp hurd 305A and hemp base fiber 305B having other diameters and lengths may be used without departing from the inventive subject matter described herein. In the process of preparing hemp hurd 305A, or hemp base fiber 305B specifically for thermoplastics extrusion, the hemp hurd 305A and hemp base fiber 305B can be prepared through several screening and reduction processes to create a more homogeneous mix. The final stage of manufacture is commonly referred to as micronizing. This can be accomplished using hammer mills, knife mills, sonic pulverization through sound wave, particle collision, wet milling, and other standardly accepted forms micronizing raw material feed stocks. Any of these micronization processes can produce a "broad range" of outputs ranging from a "sub-micron" size to larger particles that exceed 12 millimeters. The benefit of the production of a broad size range of material is that it creates greater loading of the hemp base fiber 305B, hemp hurd 305A, and any other aforementioned potential feedstocks 305 to produce a better quality EHB product. Under a cross sectional view of the EHB product under a microscope will show the feedstocks 305 are highly dispersed throughout the binder material 305C. Dispersion of these different particle sizes contributes to the overall strength of the product by eliminating weak points in the board, more consistent encapsulation of the raw materials, and improved "compressive strength" of the finished product. The dispersion of varied particle sizes in the EHB will also enhance the UV resistance of the board by eliminating UV light permeation into the matrix created by blending the hemp feedstock and binder material 305C.

The feedstocks 305 (at least one of hemp hurd 305A and hemp base fiber 305B and at least one binder material 305C) are preferably transferred to a hopper 315 of an extruder 310 and/or mixer 307 via a loading mechanism. In a preferred embodiment, a vacuum loader is used to transfer feedstock to the upstream extrusion arrangement 110. The loading mechanism is connected to a floor-mounted material bin 225 via a conveying tube though which the vacuum loader draws up the feedstocks 305 to the hopper 315. Once the hopper 315 is filled, the vacuum loader stops and the material discharges into the extruder 310 by way of gravity. The hopper 315 may be loaded using timed loading cycles or filled to a predetermined level/weight/volume by means of a level/weight/volume control, which senses whether a receiver of the hopper 315 is full and switches off the conveying action of the loading mechanism when it is determined the receiver is full. In embodiments comprising a mixer 307, the mixer 307 is preferably operably connected to the extruder 310 and directly conveys mixed feedstock to the throat 310E of the extruder 310. In some embodiments, a "Banbury" type mixer may be used prior to distribution of feedstocks to the extruder(s) to increase the level of mixing prior to extrusion. The temperature of the feedstocks 305 may be kept within a preferred temperature range to reduce the moisture content of the feedstocks 305.

In some embodiments, the hemp feedstocks may be pre-compounded or partially pre-compounded with the binder material 305C and pelletized to create feedstock pellets, which may then be added to the upstream extrusion arrangement 110. Pelletized feedstocks are mixed and compounded in a way that further increases homogeneity of the extrudate 320 due to the mixing that occurs prior to the feedstocks 305 being pelletized. Additives may be added to the upstream extrusion arrangement 110 to create custom EHB products with similar hemp feedstock and binder material compositions. In some embodiments, the feedstock pellets may further comprise additives, reducing the amount of work that must be done to manage the ratio of feedstocks/additives added to the upstream extrusion arrangement 110. The resulting finished EHB products 625 may have fewer defects as a result.

In a preferred embodiment, hemp feedstocks are compounded with binder material 107C using a FCM type mixer, which may achieve loadings of 40%-80% by weight of non-binder feedstock materials. However, other mixers may be used to compound the various feedstocks without departing from the inventive subject matter described herein. In some preferred embodiments, mixers may be used to create a plurality of pelletized feedstocks having a plurality of different loadings, which may be added to the barrel of the extruder as needed. Additionally, mixers may be used to create a plurality of specialized pelletized feedstocks comprising hemp feedstock, binder material, and one or more additive feedstocks. By using a plurality of pelletized feedstocks and specialized pelletized feedstocks having different compositions, an "additive" approach to loading the extruder may be used. This method further increases the efficiency in which users of the upstream extrusion arrangement 110 may create customized finished EHB products. The various hemp feedstocks, binder materials, and additive feedstocks may also be pre-blended to achieve various mechanical properties in the finished EHB product as well as increase the efficiency in which virgin polymers with recycled polymers are combined.

The upstream extrusion arrangement 110 generally comprises a hopper 315, drier, extruder 310, and manifold 325. The hopper 315 is preferably shaped like a tapered cone and is secured to the barrel 310C of the extruder 310. The larger end of the hopper 315 comprises a lid that may be opened and closed in a way to avoid potential contaminants that may otherwise enter the throat 310E with the feedstocks 305. A throat gate of the hopper 315 may be used to control the amount of feedstock entering the extruder 310, wherein the level of feedstock is controlled by said throat gate in such a way that the amount of feedstock in the hopper 315 is kept at a constant level as possible to ensure a constant output from the die outlet of the manifold 325.

The feedstocks 305 may be fed by the hopper 315 to the extruder 310 individually or as a blend of dry components. To help prevent clumping of the feedstocks 305 at the throat gate, the taper angle of the hopper 315 must be greater than the angle of repose of the material being extruded. If clumping is allowed to occur at the throat gate, an inconsistent amount of feedstock may be injected into the extruder 310 over time, causing inconsistency in the quality and temperature of the extrudate 320. This in turn will result in inconsistency in quality and temperature of the extrudate sheet 330 ejected from the die outlet, reducing the quality of the finished EHB product 625.

The inner surface of the hopper 315 is preferably smooth to minimize binding of the feedstocks 305 as they enter the extruder 310, which could result in the melting of the feedstocks 305 to said inner surface. Materials that the hopper 315 may comprise include, but are not limited to, metal, glass, epoxy, polymer-coated materials, or any combination thereof. A vibration device may be used to agitate the hopper 315 as the feedstock is injected into the extruder 310, which should further prevent any clumping of feedstock in the hopper 315. The temperature of the feedstock should be kept as constant as possible to increase consistency of the feedstock blends throughout the extrusion process. This may be accomplished using a heated hopper assembly.

Using a hopper heater to dry the feedstocks 305 before being fed to the extruder 310 will result in the creation of an extrudate 320 with a more consistent moisture content. Alternatively, the feedstocks 305 may be dried in another device of the system 100, allowing the hopper heater to simply maintain the moisture content within the dried feedstocks 305 prior to injection into the extruder 310 as well as to maintain a desirable feedstock temperature. In a preferred embodiment, the hopper heater is configured to blow heated air through the base of the hopper 315 and/or mixer 307, which filters through the feedstocks 305. Some of the warm air is allowed to eject from the hopper 315 to prevent a buildup of humidity from the moisture removed from the feedstocks 305. Drying times may be reduced by using a desiccant drier or vacuum drier.

In a preferred embodiment, the extruder 310 generally comprises a motor 310A, gear box 310B operably connected to the motor 310A, screw 310D operably connected to the gear box 310B, barrel 310C, and manifold 325. The extruder 310 is preferably one of a "single screw" extruder 310 or a "twin screw" extruder; however, "multi-screw extruders" or mechanical mixing which include mixing within a heated chamber may be used to create finished EHB product 625 without departing from the inventive subject matter as described herein. In some preferred embodiments, a plurality of heaters and/or cooling fans may be used to help control the temperature of the extrudate 320 created by the extruder 310 by heating or cooling the barrel 310C of the extruder 310. A screw 310D contained within the barrel 310C mixes the feedstocks 305, wherein the barrel 310C has an inner diameter at least as wide as the screw 310D. Feedstock is injected into the barrel 310C via a throat 310E of the barrel 310C, wherein the feedstock is turned into extrudate 320 as it moves through said barrel 310C due to action of the screw 310D.

The extrudate 320 is pushed through an opening of said barrel 310C and into a manifold 325, wherein a die outlet of said manifold 325 forms an extrudate sheet 330 having a desired shape that is pulled from the upstream extrusion arrangement 110. Further, shear force created by the screw 310D within the barrel 310C as it acts on the extrudate 320 forces the polymer fibers/chains of a polymer binder to align in the output direction of the machine as it exits the die outlet of the manifold 325, resulting in a material with the fibers oriented in a single direction. Although the hemp feedstocks encapsulated within the binder material 305C will also generally align in the output direction of the machine, both hemp feedstocks are highly varied in structure. This causes the composite material comprising a polymer binder to benefit from both the positive features of a material having highly ordered polymer fibers/chains as well as from the hemp feedstocks able to bond within the resulting hemp-binder matrix. As such, these will enhance key properties of the composite board such as edge strength and pull strength.

The barrel 310C is the part of the extruder 310 that contains the screw 310D. Feedstocks 305 enter the barrel 310C and are compressed against the interior walls of the barrel 310C by the action of the screw 310D. The interior surface of the barrel 310C may be smooth or grooved; however, it is important to note that the pressure increase caused by shear occurs much faster in grooved barrels than in smooth barrels. For example, gasses created by blowing agents form much faster in grooved barrels than in smooth barrels. As a result, temperatures around the throat 310E of grooved barrel extruders 310 should be kept lower than for smooth barrel extruders 310 to prevent any gasses created by the blowing agent from escaping via the throat 310E.

As illustrated in FIG. 4, the screw 310D preferably comprises a tapered cylinder of metal having a cylindrical channel cut into its surface that creates a screw channel. In a preferred embodiment, the screw 310D used to create the extrudate 320 containing a blowing agent are configured so that no pressure decrease occurs in the single zones of the screw 310D to prevent pre-foaming of the extrudate 320 within the barrel 310C before it reaches the manifold 325. The screw 310D mixes, blends, homogenizes, disperses, and compounds the feedstocks 305 as said feedstocks 305 are moved down the barrel 310C. The screw 310D of the extruder 310 of the preferred embodiment comprises a plurality of zones 311, 312, 313, which act on the feedstocks 305/extrudate 320 in combination with the interior surface of the barrel 310C. In a preferred embodiment, the screw 310D comprises a feeder zone 311, compression zone 312, and metering zone 313. Some embodiments of the screw 310D may also comprise a degassing zone that coincides with a vent of the barrel 310C to allow for the off gassing of the extrudate 320.

The feeder zone 311 is located at the throat 310E of the barrel 310C and is deep enough to take in the feedstocks 305 injected into the barrel 310C. The action of the screw 310D moves the feedstock from the feeder zone 311 to the compression zone 312 where the distance between the interior surface of the barrel 310C and the screw 310D gradually reduces build-pressure and causes friction, which then causes the binder material 305C to melt due to the increased temperature of the feedstocks 305. By melting the feedstocks 305, gasses that are created by a blowing agent can dissolve into the resulting extrudate 320 as well. In addition, the constant motion of the screw 310D mixes hemp feedstocks and melted binder material 305C to create a homogonous extrudate 320. The action of the screw 310D moves this homogonous extrudate 320 further down the barrel 310C into the metering zone 313 until all (or nearly all) of the feedstocks 305 are melted and mixed. The extrudate 320 is then pushed out of the barrel 310C through the opening of the barrel 310C at the end of the metering zone 313, allowing a die outlet of the manifold 325 to mold the extrudate 320 into an extrudate sheet 330. Temperature control of the extrudate 320 within the barrel 310C can be altered by the manipulation of several variables including, but not limited to, screw speed, screw shape, feedstock injection rate, die outlet opening size, and the difference in process gains for heating and cooling. For example, when using a single screw extruder comprising a tapered screw, an increase in screw speed increases shear within the barrel 310C, resulting in higher temperatures of the feedstocks 305/extrudate 320.

Because feedstock material pushed to the center of the screw channel of a three-zone screw within a single screw extruder can largely remain undisturbed, poor melt mixing can occur. This can result in inhomogeneous output due to non-uniform shear within the barrel 310C. Even in situations where mixing is not required due to use of a mixer 307 prior to injection into the extruder 310, temperature of the extrudate 320 within the barrel 310C of a single screw extruder will be non-uniform, which can cause alterations in output due to viscosity variations as well as distortion as the extrudate 320 cools during post-processing. This can be particularly problematic for thermoplastic binders since a slight variation in the melt temperature will have a very large effect on the viscosity of the total feedstock blends. If the melt viscosity of the feedstocks 305 closer to the center of the screw 310D is too low, agglomerates can escape the mixing action. Furthermore, differences in temperature can result in varied amounts of dissolved gas, which can create pockets of non-uniform density throughout a foamed extrudate sheet 330. Improved dispersive mixing is obtained if the melt temperature can be kept low and uniform. A lower melt temperature should also reduce thermal damage to any hemp feedstocks contained within the melted binder material 305C regardless of any treatments/alterations the hemp feedstocks underwent prior to injection into the extruder 310. Barrel cooling may be used in areas where shear heat within the barrel 310C is higher due to dispersive mixing to create a more uniform melt and reduce damage to the hemp feedstocks.

In a preferred embodiment, the screw 310D of a single screw extruder 310 should comprise both dispersive mixing sections and distributive mixing sections to improve melt mixing of the hemp feedstock and binder material 305C. These dispersive mixing sections and distributive mixing sections may be repeated multiple times to increase their effectiveness. Types of dispersive mixing sections that may be used include, but are not limited, shear/blister rings, fluted mixers, cross barrier mixers, and planetary-gear extruder 310 mixers. In a preferred embodiment, a planetary-gear extruder 310 mixer is used for good heat transfer properties, distributive mixing properties and dispersive mixing properties. Types of distributive mixing sections that may be used include, but are not limited to, slotted flight mixers, pin mixers, cavity mixers, and variable depth mixers.

In a preferred embodiment, a twin screw extruder generally comprises two screws 310D having intermeshed or partially intermeshed screw channels that are configured to co-rotate within the barrel 310C. Like the single screw extruders, the action of the screws 310D in a twin-screw extruder mix, blends, homogenizes, disperses, and compounds the feedstocks 305 as said feedstocks 305 are moved down the barrel 310C. Mixing elements of the screws 310D may be used in increase distributive and dispersive mixing within the barrel 310C. These mixing elements may include, but are not limited to reversed screw flights, kneading discs, pins, or any combination thereof. Because the twin screws constantly clean each other's screw channels, superior melt mixing can be achieved compared to single screw extruders. In some embodiments, a twin-screw extruder may be used between a single screw extruder and a manifold 325, which may result in more consistent manifold output due to more consistent pressure. The shear rates possible within a twin screw extruder can be much larger than those possible within a single screw extruder, and the output of twin screw extruders is largely dependent on pressure within the manifold 325. This higher pressure within the manifold 325 can result in a broader range of material residence times, leading to the degradation of the hemp feedstock. Furthermore, the twin grinding action of the screws can result in the reduction of longer feedstocks 305 into shorter feedstocks 305. As a result, the use of twin screw extruders may be best for creating finished EHB products 625 requiring hemp feedstocks that are shorter in length.

In some embodiments, a breaker plate and screens may be used at the die end of the barrel 310C to create back pressure and improve mixing at the dispersive and distributive mixing sections. However, the use of a breaker plate and screens should be limited to applications in which the hemp feedstocks used are of a very small length to decrease the likelihood that the screen becomes clogged and prevents the flow of extrudate 320 to the manifold 325. In embodiments of an upstream extrusion arrangement 110 comprising a twin screw extruder connecting a single screw extruder to a manifold 325, the twin screw extruder 310 may make the upstream extrusion arrangement 110 independent of back pressure, eliminating the need for breaker plates and screens. In a preferred embodiment, a gear pump extruder 310 comprising two counter rotating, interlocking gears is used to connect a single screw extruder to the manifold 325.

The manifold 325 is configured to accept the extrudate 320 from the barrel 310C of the extruder 310 via an entry channel and distribute said extrudate 320 across a width of a die outlet. The die outlet of the manifold 325 molds the extrudate 320 produced by the extruder 310 into an extrudate sheet 330 having a desired shape, wherein said desired shape may or may not require further processing via a choker bar, lower lip, flex-lip, and/or machinery of a downstream extrusion arrangement 115 to produce a finished EHB product 625. In a preferred embodiment, a slit manifold is used to create the extrudate sheet 330 that is to be shaped into a finished EHB product 625, wherein said slit manifold may have symmetrical or asymmetrical die outlet. The symmetrical die outlet provides a superior flow distribution compared to that of an asymmetrical die outlet due to the features of the two halves of the die outlet being identical, which results in fewer potential defects in the extrudate sheet 330 once it has cooled; however, an asymmetrical die outlet may incorporate features into the extrudate sheet 330 prior to post-extrusion processing, resulting in a lower cost of production for finished EHB products 625 possessing enhanced features such as "tongue and groove," slots, depressions, linear scoring, ridges, waves, thicker or thinner sections, angles, profiles, etc. For example, the manifold 325 may be configured to mold finished EHB product 625 into the shape of furniture components, which can replace plywood, OSB or other traditional wood-based components. The finished EHB product 625 furniture components should be cheaper to produce and be capable of producing flexible shapes and sizes and should require less processing, resulting in less waste than wood-based components.

In some preferred embodiments, the method the present disclosure may be used to produce ordered components that may be used to create an entire structure. These ordered components are preferably configured to fit together in a very specific manner, and may comprise finished EHB products 625 including, but not limited to, boards, beams, wallboard, duct liner, duct board, roof boards, etc. In a preferred embodiment, the structure create by these ordered components is a residential home. For example, ordered components may be configured to fit together in a way such that a mobile home may be constructed, which may result in more affordable and environmentally friendly mobile homes that what is currently available. Due to the nature of extrusion and the materials used to create finished EHB products 625, ordered components may be specifically created for inexpensive, easy to assemble emergency shelters when compared to emergency shelters created using traditional construction materials. For example, ordered components may be configured to fit together in a way such that an emergency barracks may be constructed quickly in a natural disaster zone, which may provide temporary shelter for those left homeless by a disaster.

In another preferred embodiment, the die outlet may be configured to create patterns 905 as the extrudate 320 is ejected from the die outlet to form the extrudate sheet 330. For example, as illustrated in FIG. 9, the die may be configured to output an extrudate sheet 330 comprising a plurality of micronized grooves on at least one of the surfaces, wherein the microgrooves increase adhesion of a finishing coating or adhesive, such as laminates, paper, films, paint, tar, wax, glue, or any combination thereof. In other embodiments, a router may be used to create channels within the extrudate sheet 330. Patterns 905 that may be implemented into the extrudate sheet 330 via the die include, but are not limited to, micronized grooves, popcorn, orange peel, knockdown, sand swirl, slap brush, and comb. The die may also be configured to produce an extrudate sheet 330 comprising at least one molded shape. In one preferred embodiment, the at least one molded shape is located on one or more edges of the extrudate sheet 330. For example, as illustrated in FIG. 10, an extrudate sheet 330 optimized for wallboard may comprise an architectural molding on one edge and a flat surface on the other edge, wherein the architectural molding formed by the die as the extrudate 320 is extruded to form the extrudate sheet 330. Molded shapes 805 that may be implemented into the extrudate sheet 330 via the die include, but are not limited to, base architectural molding, crown architectural molding, and corner architectural molding.

In some preferred embodiments, the die outlet may be optimized to produce a finished EHB product 625 optimized for decking and/or fencing applications. Finished EHB products 625 optimized for such applications may be expected to perform exceptionally well due to a higher water/pest resistance as well as due to a more consistent grain resulting from the dispersive and disruptive mixing that occurs during extrusion. Dies configured to produce common sizes are optimal for producing decking and fencing. For example, a finished EHB product 625 optimized for decking and/or fencing may be output from the die and/or shaped into any traditional size, including, but not limited to, 2"×4", 2"×6", 2"×8", 1"×4", 1"×6", and 1"×4". In one preferred embodiment, a finished EHB product 625 optimized for decking and/or fencing may be "scored" in order to allow for a complete sheet of boards to be shipped to an installation site, where the boards may then be snapped apart with minimal effort prior to installation. In a preferred embodiment, finished EHB products 625 optimized for decking and fencing utilizes a tongue and groove system to create true privacy fences that are interconnected without the need for an abundance of fasteners. This system may also be used to create a "solid deck" having minimal or no gapping between the boards.

Once the extrudate 320 has been pushed through the die outlet to form the extrudate sheet 330, the extrudate sheet 330 may be further shaped and gradually cooled by the downstream extrusion arrangement. As previously mentioned, one of the advantages of the extrusion production process for creating a finished EHB product 625 is that it may be used to produce a number of different patterns, textures, and designs that provide functional benefits in addition to aesthetic value. For example, a finished EHB product 625 optimized for decking may comprise channels that run the length of the board. By changing the overall surface area of the finished EHB product 625 with high, then low channels, a heat sink effect is produced, which increases the amount of heat dissipated by the board. These channels may also be configured to serve as a gutter to move water away from the home when properly installed. In some preferred embodiments, a finished EHB product 625 optimized for decking may comprise a pattern 905 that includes a raised height with a dimpled surface that reduces contact with human feet and other body parts. Additionally, a dimpled surface, as illustrated in FIG. 11, will dissipate radiational heat by increasing the overall surface area of the board as well as increase friction that reduces the likelihood of slipping when walking on said board.

Finished EHB products 625 optimized for decking board and fencing board applications are preferably made from post-consumer/post-industrial recycled thermoplastics and thermoplastics, or a blend of other highly loaded recycled materials plus small amounts of virgin material to increase flow rates. Hemp feedstocks for decking/fencing preferably range from 15% to 70% by volume of the extrudate 320, depending on the target application and board thickness. For example, in cold climates, thermoplastics will become more brittle as the temperature approaches freezing (and falls below freezing), so a board comprising a higher amount of hemp feedstock may be more desirable. By increasing the impact strength through either a reduction in the total hemp loading or by increasing the amount of the impact modifier, or both, an extruded board can be created that can handle cold temperature environments with greater impact resistance.

Further, finished EHB products 625 optimized for decking and/or fencing possess natural UV resistance due to the hemp feedstocks dispersed throughout. This UV resistance in combination with the water resistance, resulting from the encapsulation of said hemp feedstocks in a hydrophobic binder material, will create a natural barrier to UV degradation and water resistance for years of service life beyond that of traditional wood decking. In some embodiments, the incorporation of metal nanoparticles or other compounds/elements, such as chromated copper arsenate and zinc, may be used to provide resistance to fungal growth and pests. Additionally, finished EHB products 625 optimized for fencing and decking do not experience the same accelerated degradation that occurs in traditional wood decking/fencing when fasteners used to secure the decking/fencing to a framework create holes that form intrusion points for water and pests, and which increase in size as the boards experience freeze and thaw cycles in cold and temperate climates. The resistance to decay around the holes created by fasteners shown by finished EHB products 625 optimized for fencing and decking is due to the composition of the extrudate 320 and the inherent water, fungal, and pest resistance of the finished EHB product 625.

In a preferred embodiment, a slit manifold in the shape of a coat-hanger is used to distribute the extrudate 320 to the die outlet. Slit manifolds of the T variety and fishtail variety may be used without departing from the inventive subject matter described herein. In a preferred embodiment, the manifold 325 is made of steel but may comprise other materials, including, but not limited to brass, aluminum or composites, without departing from the inventive subject matter described herein. An island of the manifold 325 prior to the die outlet allows for equal pressure drop to all points of the die outlet, allowing for a balanced flow distribution prior to exit through said die outlet.

The temperature of the manifold 325 is preferably controlled so that it is the same temperature as the extrudate 320 to reduce temperature differences (and therefore viscosity differences) in the extrudate 320 as the extrudate 320 makes its way to die outlet. Temperature differences could result in differences in flow distribution across the manifold 325 and cause extrudate 320 to coalesce into defects within the finished EHB product 625, so it is important to keep the temperature of the extrudate 320 as consistent as possible within the manifold 325. In some embodiments, the manifold 325 may comprise multiple heaters so that the heat zones may be used to control flow of the extrudate 320 through the manifold 325. Types of heaters that may be used to heat the manifold 325 include, but are not limited to, plate heaters, cast heaters, and cartridge heaters. In a preferred embodiment, an electric heater is used to control the temperature of the walls of the manifold 325. In some preferred embodiments, the temperature of the walls of the manifold 325 may be higher than that of the extrudate 320 to create a glossy finish on the extrudate 320.

Due to shear forces acting on extrudates 320, the resulting EHB product may be anisotropic in its behavior. The addition of hemp feedstocks to the binder material 305C can improve the properties of the finished EHB product 625 by increasing the binding between layers. Though the same shear forces acting on the hemp feedstocks can cause said hemp feedstocks to align in the same general direction as the binder material 305C, hemp feedstocks can also strongly bond with the binder material 305C in which it is encapsulated, resulting in a strong hemp-binder matrix. Blends of hemp feedstocks of varying sizes can impart benefits that feedstocks 305 having a smaller size range might not produce due to a wider variety of bonding. For example, where blends of the hemp base fiber 305B and hemp hurd 305A contain variable lengths (potentially not discernible to the human eye, but as measured in microns), micronized hemp base fiber 305B and micronized hemp hurd 305A will fill in voids (voids being defined as areas where there is significantly more binder material than hemp material as observed under a microscope) and create a hemp composite material with increased strength and fewer defective areas due to more structure strength due to the more consistent hemp-binder matrix.

Additionally, the binding of the binder material to the micronized hemp feedstocks will negate the effect of any variability of the orientation of the hemp ingredients in the extrusion process. The orientation of dispersed/distributed hemp base fiber 305B and/or hemp hurd 305A of various lengths within the extruded composite will create benefits when the machine direction versus transverse direction of the finished product is considered since it will result in a finished product with increased flexural modulus, increased tensile strength, and natural UV inhibition. Further, when the binder material used to make the composite material is a thermoplastic binder, encapsulation of the hemp base fiber 305B and hemp hurd 305A within the thermoplastic binder provides increased water resistance.

Once the extrudate sheet 330 has been pushed through the die outlet, it is shaped and gradually cooled by the downstream extrusion arrangement 115. In a preferred embodiment, the downstream extrusion arrangement 115 comprises a plurality of rollers 505, heater/coolers 510, cutters 515, molders 520, sanders 525, painters 530, and stacker. Initial sizing past the manifold 325 may be accomplished via the plurality of rollers that compress the extrudate sheet 330 to the desired thickness and/or corrugate the extrudate sheet 330 with a desired texture. A puller pulls the extrudate sheet 330 from the extruder 310. A series of polishing rolls may be used to achieve a good surface finish with minimal defects for finished EHB product 625. In some embodiments, heated rollers may be used to keep the temperature such that the extrudate sheet 330 is still pliable to allow for further sizing, compression (for the removal of air), and compaction of the extrudate sheet 330. A plurality of water-cooled rollers or a cooling tank may be used to cool the extrudate sheet 330 once it has been formed. Where the extrudate sheet 330 has cooled beyond a "pliable or malleable state", further processing may be accomplished via planing, sanding, cutting, or any combination thereof.

In a preferred embodiment, the extrudate sheet 330 is pressed in line and under heat at the binder softening temperature so that compression and/or shaping of the extrudate sheet 330 may occur. Rollers and/or a post-curing processing methods may then be used to form patterns 905 on one or more surfaces of the extrudate sheet 330 while it is still pliable. In some embodiments, patterns 905 created by rollers and/or a post-curing processing methods may be implemented on the surfaces in addition to patterns 905 created by the die. For example, the die may be configured to create an extrudate sheet 330 having a knockdown pattern on one or more surfaces of the extrudate sheet 330 whereas the rollers may be configured to add a plurality of micronized grooves to one or more surfaces of the extrudate sheet 330. Patterns 905 that may be implemented into the extrudate sheet 330 via the rollers and/or post-curing processing methods include, but are not limited to, micronized grooves, popcorn, orange peel, knockdown, sand swirl, slap brush, and comb.

Rollers and/or a post-curing processing methods of the downstream extrusion arrangement may also be configured to produce an extrudate sheet 330 comprising at least one molded shape. Molded shapes 805 may be formed by the rollers and/or post-curing processing methods either with the output direction of the die or perpendicular with the output direction of the die. For example, as illustrated in FIG. 10, an extrudate sheet 330 may be shaped by the rollers into a single piece having a plurality of architectural molding shapes in a single piece and perpendicular to the output direction of the die. Molded shapes 805 that may be implemented into the extrudate sheet 330 via the die include, but are not limited to, base architectural molding, crown architectural molding, and corner architectural molding.

Where the extrudate sheet 330 has cooled beyond a "pliable or malleable state", further processing may be accomplished by several finishing processes, including, but not limited to, rollers, planing, sanding, cutting, routing, scoring or any combination thereof. A planer and/or sander may be used to size the extrudate sheet 330 to its final thickness, width, and/or length. The use of a planer, sander, router, etc. may also be used to transform the sides of the extrudate sheet 330 into interlocking edges. As illustrated in FIG. 6, the finished EHB product 625 may comprise a first edge and second edge configured to interlock with one another. In a preferred embodiment, a plurality of finished EHB boards may be fitted together using locking edges, wherein a first edge of a first finished EHB boards is configured to interlock with a second edge of a second finished EHB boards. The plurality of edges of the finished EHB boards is preferably "tongue and groove" style, which allows for the first finished EHB boards to interlock with the second finished EHB boards. In another preferred embodiment, the locking edges of the finished EHB boards may be comprise a notch and groove style edge as depicted in FIG. 6, which may allow for easier installation when compared to other locking edge styles. In other embodiments, the post-curing processing methods (planing, sanding, routing, etc.) may be used to create channels within the extrudate sheet 330. The channels are preferably located on the bottom surface of the extrudate sheet 330 and sized in a way such that electrical hardware, plumbing, and radiant heating may installed in the channels.

In one preferred embodiment, an inline cutting device may be used to cut the extrudate sheet 330 to the desired length. The inline cutting device may also be used to cut more intricate shapes into the extrudate sheet 330, such as slots, holes, custom angles, edges, and fastener points. In a preferred embodiment, the inline cutting device comprises at least one of reciprocal blades, wheels, knives, laser, water, or CNC type cutting. For right-angled smooth cuts, it is essential to select the correct saw speed and blade for the polymer used and the thickness of the sheet. After cutting, the resulting finished EHB product 625 is lifted by a stacker and stacked. Alternatively, the stacker may move the finished EHB product 625 to a conveyor where it may be at least one of primed, painted, chemically treated, corona treated, edge coated, laser etched, laminated, tarred or any combination thereof.

Due to the use of recycled materials and sustainable hemp feedstocks, the various finished EHB products 625 created using the methods described herein will result in a tremendous benefit to the environment when evaluated through a life cycle analysis (LCA). Finished EHB products 625 under LCA will show that by using sustainable hemp feedstocks, reclaimed "waste" materials from construction and manufacturing processes, reduced shipping weights, and streamlined processing will dramatically offset the carbon offenses in the construction industry, and provide permanent carbon sequestration opportunities that currently do not exist today in available solutions. Additionally, the methods described herein include the possibility of including carbonized materials into the final product by using it as a feedstock, allowing for high carbon sequestration crops, such as hemp and/or bamboo, to be grown and turned into bio-carbon via pyrolysis before incorporation into the process described herein as a feedstock and carbon sink. This is possible because of the unique way that finished EHB products 625 are produced using the method described herein. As such, when compared with the traditional methods or production for traditional construction materials, the LCA will show that the finished EHB products 625 produced by the methods described herein are not only superior in terms of carbon capture but are also more sustainable.

Although a few variations have been described in detail above, other modifications or additions are possible. Further features and/or variations can be provided in addition to those set forth herein. For example, the implementations described above can be directed to various combinations and sub-combinations of the disclosed features and/or combinations and sub-combinations of several further features disclosed above. In addition, any methods discussed in the accompanying figures and/or described herein do not necessarily require the particular order shown, or sequential order, to achieve desirable results. It will be readily understood to those skilled in the art that various other changes in the details, materials, and arrangements of the parts and process stages which have been described and illustrated to explain the nature of this inventive subject matter can be made without departing from the principles and scope of the inventive subject matter.

What is claimed is:

1. A method for making a mono-extruded hemp composite board (EHB) comprising the steps of:
   obtaining hemp feedstock comprising at least one of hemp hurd and hemp fiber, obtaining a binder material comprising at least one of thermoplastic/thermoset, any/other polymer binder, natural binder/glue or non-natural binder/glue obtaining an EHB extruding system comprising an extruder, puller, and plurality of rollers,
   injecting said hemp hurd, hemp fiber, and binder material into said extruder,
      wherein said extruder creates an extrudate using said hemp feedstock and binder material,
      wherein a heated barrel of said extruder keeps said extrudate within a desired temperature range,
      wherein said desired temperature range is higher than a melting point of said binder material and lower than a combustion point of said hemp hurd and said hemp fiber,
      wherein a combined volume percentage of said hemp hurd and said hemp fiber makes up at least 8% of a total volume percentage of said hemp hurd, hemp fiber, and binder material transferred to said extruder,
   obtaining a blowing agent configured to foam said extrudate,
      wherein gasses of said blowing agent dissolve into said extrudate to create a foamed extrudate,
   injecting said blowing agent into said extruder to create said foamed extrudate,
   controlling a shear force of said extruder to manipulate a viscosity of said foamed extrudate,
      wherein said foamed extrudate is expelled from extruder via a die outlet of a manifold at a rate relative to said viscosity,
      wherein said die outlet forms said foamed extrudate into a foamed extrudate sheet,
   pulling said foamed extrudate sheet from said extruder via a puller,
      wherein said puller removes said foamed extrudate sheet from said die outlet at a desired speed,
      wherein said desired speed is used to control a thickness of said foamed extrudate sheet, and
   molding said foamed extrudate sheet into shaped EHB using said plurality of rollers,
      wherein said plurality of rollers alter at least one of an EHB thickness and EHB width, wherein said foamed extrudate sheet is heated as said plurality of rollers alter at least one of said EHB thickness and said EHB width.

2. The method of claim 1, wherein said extruder is one of a single screw extruder and a twin screw extruder.

3. The method of claim 1, wherein said hemp fiber has been processed to remove at least one of pectins and lignins.

4. The method of claim 1, wherein said hemp feedstock comprises both hemp hurd and hemp fiber, wherein a volume of said hemp hurd of said hemp feedstock is approximately three times greater than said volume of said hemp fiber.

5. The method of claim 1, further comprising additional steps of:
   obtaining bio derived carbon,
      wherein said bio derived carbon is obtained via a pyrolysis process, and
   injecting said bio derived carbon into said extruder with said hemp hurd, hemp fiber, and binder material.

6. The method of claim 1, further comprising additional steps of:
   obtaining at least one of glass fibers, wood fines, and gypsum, and
   injecting at least one of said glass fibers, wood fines, and gypsum into said extruder with said hemp hurd, hemp fiber, and binder material.

7. The method of claim 1, wherein said hemp feedstock makes up no more than 70% of a total volume percentage of said extrudate.

\* \* \* \* \*